US007599155B2

(12) United States Patent
Saito et al.

(10) Patent No.: US 7,599,155 B2
(45) Date of Patent: *Oct. 6, 2009

(54) SELF-PINNED CPP GIANT MAGNETORESISTIVE HEAD WITH ANTIFERROMAGNETIC FILM ABSENT FROM CURRENT PATH

(75) Inventors: Masamichi Saito, Niigata-ken (JP); Yoshihiro Nishiyama, Niigata-ken (JP); Yosuke Ide, Niigata-ken (JP); Eiji Umetsu, Niigata-ken (JP); Naoya Hasegawa, Niigata-ken (JP); Yasuo Hayakawa, Niigata-ken (JP)

(73) Assignee: TDK Corporation, Tokyo (JP)

( * ) Notice: Subject to any disclaimer, the term of this patent is extended or adjusted under 35 U.S.C. 154(b) by 376 days.

This patent is subject to a terminal disclaimer.

(21) Appl. No.: 10/823,474

(22) Filed: Apr. 13, 2004

(65) Prior Publication Data

US 2004/0207960 A1    Oct. 21, 2004

(30) Foreign Application Priority Data

Apr. 18, 2003   (JP)   ............................. 2003-114189
Jul. 10, 2003   (JP)   ............................. 2003-195159
Feb. 24, 2004   (JP)   ............................. 2004-047757

(51) Int. Cl.
*G11B 5/39*   (2006.01)
(52) U.S. Cl. ................................. 360/324.11; 360/322
(58) Field of Classification Search ............ 360/324.11, 360/324.2, 322
See application file for complete search history.

(56) References Cited

U.S. PATENT DOCUMENTS 5,390,061 A * 2/1995 Nakatani et al. ......... 360/324.2

5,583,725 A   12/1996 Coffey et al.
5,898,548 A *  4/1999 Dill et al. ................. 360/324.2
6,023,395 A    2/2000 Dill et al.

(Continued)

FOREIGN PATENT DOCUMENTS

EP    1 416 474 A2    5/2004

(Continued)

OTHER PUBLICATIONS

Search Report dated Jul. 21, 2004 for Great Britain Application GB0408133.7.

(Continued)

*Primary Examiner*—Craig A Renner
(74) *Attorney, Agent, or Firm*—Brinks Hofer Gilson & Lione

(57) ABSTRACT

A CPP giant magnetoresistive head includes lower and upper shield layers, and a giant magnetoresistive element disposed between the upper and lower shield layers and including a pinned magnetic layer, a free magnetic layer and a nonmagnetic layer disposed between the pinned magnetic layer and the free magnetic layer. In the CPP giant magnetoresistive head, the pinned magnetic layer extends to the rear of the nonmagnetic layer and the free magnetic layer in the height direction, and the dimension of the pinned magnetic layer in the height direction is larger than that in the track width direction. Also, the pinned magnetic layer comprises a magnetic material having a positive magnetostriction constant or a magnetic material having high coercive force, and the end of the pinned magnetic layer is exposed at a surface facing a recording medium.

8 Claims, 17 Drawing Sheets

U.S. PATENT DOCUMENTS

| | | | |
|---|---|---|---|
| 6,052,263 | A | 4/2000 | Gill |
| 6,127,045 | A | 10/2000 | Gill |
| 6,127,053 | A * | 10/2000 | Lin et al. ............... 360/324.11 |
| 6,210,818 | B1 | 4/2001 | Saito |
| 6,219,212 | B1 | 4/2001 | Gill et al. |
| 6,259,586 | B1 | 7/2001 | Gill |
| 6,330,136 | B1 | 12/2001 | Wang et al. |
| 6,381,171 | B1 * | 4/2002 | Inomata et al. ............. 365/173 |
| 6,466,419 | B1 | 10/2002 | Mao |
| 6,501,626 | B1 | 12/2002 | Gill |
| 6,542,342 | B1 * | 4/2003 | Hayashi et al. .......... 360/324.2 |
| 6,757,144 | B2 * | 6/2004 | Carey et al. .............. 360/324.2 |
| 7,092,221 | B2 * | 8/2006 | Gill ....................... 360/324.11 |
| 7,220,499 | B2 * | 5/2007 | Saito et al. ............. 360/324.11 |
| 2002/0135956 | A1 * | 9/2002 | Hasegawa et al. ...... 360/324.12 |
| 2002/0172840 | A1 | 11/2002 | Terada et al. |
| 2003/0103299 | A1 * | 6/2003 | Saito ..................... 360/324.12 |
| 2004/0008450 | A1 * | 1/2004 | Gill ....................... 360/324.11 |
| 2004/0207962 | A1 * | 10/2004 | Saito et al. ............. 360/324.11 |
| 2004/1020795 | * | 10/2004 | Saito ....................... 360/324.1 |

FOREIGN PATENT DOCUMENTS

| | | |
|---|---|---|
| GB | 2 394 827 A | 5/2004 |
| GB | 2 398 920 A | 9/2004 |
| JP | 2000-123325 | 4/2000 |
| JP | 2001-266313 | 9/2001 |
| JP | 2001-307307 | 11/2001 |
| JP | 2002-232040 | 8/2002 |
| JP | 2002-305338 | 10/2002 |
| JP | 2002-314168 | 10/2002 |
| JP | 2002-319112 | 10/2002 |

OTHER PUBLICATIONS

Examination Report issued on Feb. 10, 2006 for corresponding British Patent Application No. 0600037.6

* cited by examiner

SELF-PINNED CPP GIANT MAGNETORESISTIVE HEAD WITH ANTIFERROMAGNETIC FILM ABSENT FROM CURRENT PATH

This application claims the benefit of priority to Japanese Patent Application No. 2003-114189, 2003-195159 and 2004-047757 herein incorporated by reference.

BACKGROUND OF THE INVENTION

1. Field of the Invention

The present invention relates to a CPP (Current Perpendicular to the Plane) giant magnetoresistive head in which a sensing current flows in the thickness direction (perpendicularly to the film plane).

2. Description of the Related Art

Giant magnetoresistive (GMR) elements used for hard disk devices and magnetic sensors are roughly divided into a CIP (Current in the Plane) type in which a sensing current flows in parallel with the film plane of each of layers constituting an element, and a CPP (Current Perpendicular to the Plane) type in which a sensing current flows perpendicularly to the film plane of each of the layers constituting an element.

FIG. 21 is a longitudinal sectional view showing the structure of a CPP-GMR head using a conventional CPP-GMR element. A CPP-GMR head 100 comprises a lower shield layer 110 extending in the X direction shown in the drawing, a lower nonmagnetic metal film 120 formed on the lower shield layer 110 at its center in the X direction, and a free magnetic layer 131, a nonmagnetic metallic material layer 132, a pinned magnetic layer 133, an antiferromagnetic layer 134, and an upper nonmagnetic metal film 140, which are laminated on the lower nonmagnetic metal film 120. The pinned magnetic layer 133 may further include a first pinned magnetic layer 133a, a non-magnetic intermediate layer 133b and a second pinned magnetic layer 133c. The CPP-GMR head 100 further comprises an upper shield layer 150 formed over the upper nonmagnetic metal film 140 to extend in the X direction, hard bias layers 163 in contact with parts of the free magnetic layer 131 and with both sides of the nonmagnetic layer 132, insulating layers 161 filling in the respective spaces between the hard bias layers 163 and the lower shield layers 110, and insulating layers 164 filling in the respective spaces between the hard bias layers 163 and the upper shield layer 150. Furthermore, bias underlying layers 162 are disposed between the hard bias layers 163 and the insulating layers 161.

In the CPP-GMR head having the above-described construction, the lower shield layer 110 and the upper shield layer 150 function as electrode films, and a current also flows through the lower shield layer 110 and the upper shield layer 150. As generally known, each of the lower shield layer 110 and the upper shield layer 150 comprises a soft magnetic material, for example, NiFe or the like. Therefore, when the current flows through the lower shield layer 110 and the upper shield layer 150, an AMR (anisotropic magnetoresistance) effect occurs to change the resistances of the lower shield layer 110 and the upper shield layer 150. The change in resistance becomes noise of the output of the head.

Particularly, with a high current density, there is the problem of increasing the noise due to the AMR effect. For example, in the example shown in the drawing, the current density is increased at the entrance of a sensing current (the contact portion between the lower shield layer 110 and the lower nonmagnetic metal film 120, and the contact portion between the upper shield layer 150 and the upper nonmagnetic metal film 140).

In order to decrease the noise due to the AMR effect, it is thought to use a shield material with a low AMR effect for forming the lower shield layer 110 and the upper shield layer 150. However, a sufficient magnetic shield effect cannot be obtained by using the shield material with a low AMR effect.

In the CPP-GMR head having the above-described construction, the sensing current also flows through the antiferromagnetic layer 134 comprising, for example, Pt—Mn. The antiferromagnetic layer 134 has a resistivity of about 200 μΩ·cm which is significantly higher than those of the nonmagnetic metal films 120 and 140, the free magnetic layer 131, and the pinned magnetic layer 133. Also, the antiferromagnetic layer 134 must be thickly formed for maintaining antiferromagnetic characteristics. For example, when the distance between the upper and lower shields is about 600 Å, the thickness of the antiferromagnetic layer 134 is about 200 Å. When the thick antiferromagnetic layer 134 having high resistivity is provided, the antiferromagnetic layer 134 has high resistance and thus generates heat when the sensing current flows therethrough. Since the temperature of the whole of the head is increased by the generated heat (Joule heat), the reliability and high-frequency characteristics of the head deteriorate. Also, the thick antiferromagnetic layer 134 causes a difficulty in decreasing the shield distance between the upper and lower shield layers, thereby causing a disadvantage to increasing the recording density.

In a CIP-GMR head, only about 10 percent of a sensing current flows through an antiferromagnetic layer, and the sensing current never flows through shield layers, thereby causing none of the above problems.

SUMMARY OF THE INVENTION

Accordingly, it is an object of the present invention to provide a CPP giant magnetoresistive head capable of stabilizing the magnetization direction of a pinned magnetic layer without using an antiferromagnetic layer provided in a giant magnetoresistive element, realizing a narrower reproduction shield distance, and decreasing noise due to the AMR effect of shield layers and Joule heat.

The present invention has been achieved in consideration of the fact that the Joule heat generated during the operation of a head can be significantly decreased by stabilizing the magnetization direction of a pinned magnetic layer without using an antiferromagnetic layer, and a nonmagnetic metal film can be thickly formed to further decrease the element resistance.

In a first aspect of the present invention, a CPP giant magnetoresistive head comprises lower and upper shield layers with a predetermined shield distance therebetween, and a giant magnetoresistive element disposed between the upper and lower shield layers and comprising a pinned magnetic layer, a free magnetic layer and a nonmagnetic layer disposed between the pinned magnetic layer and the free magnetic layer, a current flowing perpendicularly to the film plane of the giant magnetoresistive element, wherein the pinned magnetic layer extends to the rear of the nonmagnetic layer and the free magnetic layer in the height direction, and the dimension of the pinned magnetic layer in the height direction is larger than that in the track width direction.

In the CPP magnetoresistive head, shape anisotropy occurs in the pinned magnetic layer in parallel with the height direction, and thus the magnetization direction of the pinned magnetic layer can be stabilized in a direction parallel to the height direction without using an antiferromagnetic layer for pinning the magnetization direction of the pinned magnetic layer.

The pinned magnetic layer preferably comprises a magnetic material having a positive magnetostriction constant or a magnetic material having high coercive force, and is exposed at a surface facing a recording medium. In this case, the symmetry of two-dimensional isotropic stress applied to the pinned magnetic layer is broken to apply uniaxial tensile stress to the pinned magnetic layer in parallel with the height direction. The inverse magnetostrictive effect can further stabilize magnetization of the pinned magnetic layer in a direction parallel to the height direction.

In a second aspect of the present invention, a CPP giant magnetoresistive head comprises lower and upper shield layers with a predetermined shield distance therebetween, and a giant magnetoresistive element disposed between the upper and lower shield layers and comprising a pinned magnetic layer, a free magnetic layer and a nonmagnetic layer disposed between the pinned magnetic layer and the free magnetic layer, a current flowing perpendicularly to the film plane of the giant magnetoresistive element, wherein the pinned magnetic layer comprises a magnetic material having a positive magnetostriction constant or a magnetic material having high coercive force, and is exposed at a surface facing a recording medium.

In the CPP magnetoresistive head, the end surface of the pinned magnetic layer is exposed to break the symmetry of two-dimensional isotropic stress applied to the pinned magnetic layer, thereby applying uniaxial tensile stress to the pinned magnetic layer in parallel with the height direction. The inverse magnetostrictive effect can stabilize magnetization of the pinned magnetic layer in a direction parallel to the height direction without using an antiferromagnetic layer for pinning the magnetization of the pinned magnetic layer.

The dimension of the pinned magnetic layer in the height direction is preferably larger than the dimension in the track width direction. In this case, magnetization of the pinned magnetic layer is stabilized by shape anisotropy in a direction parallel to the height direction.

In each of the above-described CPP giant magnetoresistive heads, the pinned magnetic layer practically has a laminated ferrimagnetic structure comprising a first pinned magnetic layer and a second pinned magnetic layer which are laminated with a nonmagnetic intermediate layer disposed therebetween. The pinned magnetic layer may partially or entirely comprise Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or CO$_2$MnY (wherein Y is at least one element of Ge, Si, Sn, and Al).

An antiferromagnetic layer may be provided in the rear of the giant magnetoresistive element in the height direction, for pinning the magnetization direction of the pinned magnetic layer in the height direction. When the antiferromagnetic layer is disposed outside the giant magnetoresistive element, the antiferromagnetic layer does not generate heat to prevent an increase in the generated Joule head even when the sensing current flows through the giant magnetoresistive element. Also, even when the antiferromagnetic layer is provided, the distance between the upper and lower shields need not be increased. By providing the antiferromagnetic layer as described above, magnetization of the pinned magnetic layer can be strongly pinned by an exchange coupling magnetic field produced at the interface between the antiferromagnetic layer and the pinned magnetic layer. In order to prevent a sensing current loss, the antiferromagnetic layer is preferably an insulating antiferromagnetic layer comprising, for example, Ni—O or α-Fe$_2$O$_3$, or comprises an insulating antiferromagnetic comprising, for example, Ni—O or α-Fe$_2$O$_3$ and an antiferromagnetic metal layer interposed between the insulating antiferromagnetic layer and the pinned magnetic layer.

Furthermore, large-area nonmagnetic metal films are preferably provided between the giant magnetoresistive element and the lower shield layer and between the giant magnetoresistive element and the upper shield layer, respectively, so that the large-area nonmagnetic metal films are in direct contact with the pinned magnetic layer and the free magnetic layer and have larger areas than those of the pinned magnetic layer and the free magnetic layer, respectively. When the large-area nonmagnetic metal films are present, the concentration of the sensing current in the lower shield layer and the upper shield layer is relieved to decrease noise due to the AMR effect of the lower shield layer and the upper shield layer.

The large-area nonmagnetic metal film disposed between the giant magnetoresistive element and the lower shield layer preferably comprises any one of Ta/Cu, Ta/Ru/Cu, Ta/Cr, Ta/Ni—Cr, Ta/(Ni—Fe)—Cr, and Cr, and when the composition contains Cr, the Cr content preferably exceeds 20 atomic percent. The large-area nonmagnetic metal film having this composition functions as a seed layer for regularly forming the giant magnetoresistive element. Therefore, magnetization of the pinned magnetic layer laminated on the large-area nonmagnetic metal film is also stabilized by the seed effect of the large-area nonmagnetic metal film.

In the present invention, the magnetization of the pinned magnetic layer is stabilized in the height direction by the shape anisotropy and/or the inverse magnetostrictive effect, and thus the antiferromagnetic layer need not be provided for pinning the magnetization direction of the pinned magnetic layer. Therefore, a narrower reproduction shield distance can be realized, and Joule head and noise due to the AMR effect of the shied layer during the operation of the head can be decreased.

BRIEF DESCRIPTION OF THE DRAWINGS

FIGS. 5A and 5B are partial sectional views showing a step of a method for manufacturing the CPP giant magnetoresistive head shown in FIG. 1, in which FIG. 5A is a partial section view from the surface facing the recording medium, and FIG. 5B is a partial sectional view taken along a central line of the element in parallel with the height direction;

FIGS. 6A and 6B are partial sectional views showing a step after the step shown in FIG. 5, in which FIG. 6A is a partial section view from the surface facing the recording medium, and FIG. 6B is a partial sectional view taken along a central line of the element in parallel with the height direction;

FIGS. 7A and 7B are partial sectional views showing a step after the step shown in FIG. 6, in which FIG. 7A is a partial section view from the surface facing the recording medium, and FIG. 7B is a partial sectional view taken along a central line of the element in parallel with the height direction;

FIGS. 8A and 8B are partial sectional views showing a step after the step shown in FIG. 7, in which FIG. 8A is a partial section view from the surface facing the recording medium, and FIG. 8B is a partial sectional view taken along a central line of the element in parallel with the height direction;

FIGS. 12A and 12B are partial sectional views showing a step of a method for manufacturing the CPP giant magnetoresistive head shown in FIGS. 9 to 11, in which FIG. 12A is a partial section view from the surface facing the recording medium, and FIG. 12B is a partial sectional view taken along a central line of the element in parallel with the height direction;

FIGS. 13A and 13B are partial sectional views showing a step after the step shown in FIG. 12, in which FIG. 13A is a partial section view from the surface facing the recording medium, and FIG. 13B is a partial sectional view taken along a central line of the element in parallel with the height direction;

DESCRIPTION OF THE PREFERRED EMBODIMENTS

The present invention will be described below with reference to the drawings. In each of the drawings, the X direction corresponds to the track width direction, the Y direction corresponds to the direction of a leakage magnetic field from a recording medium, the Z direction corresponds to the moving direction of the recording medium and the lamination direction of layers which constitute a giant magnetoresistive element.

Figure 1:
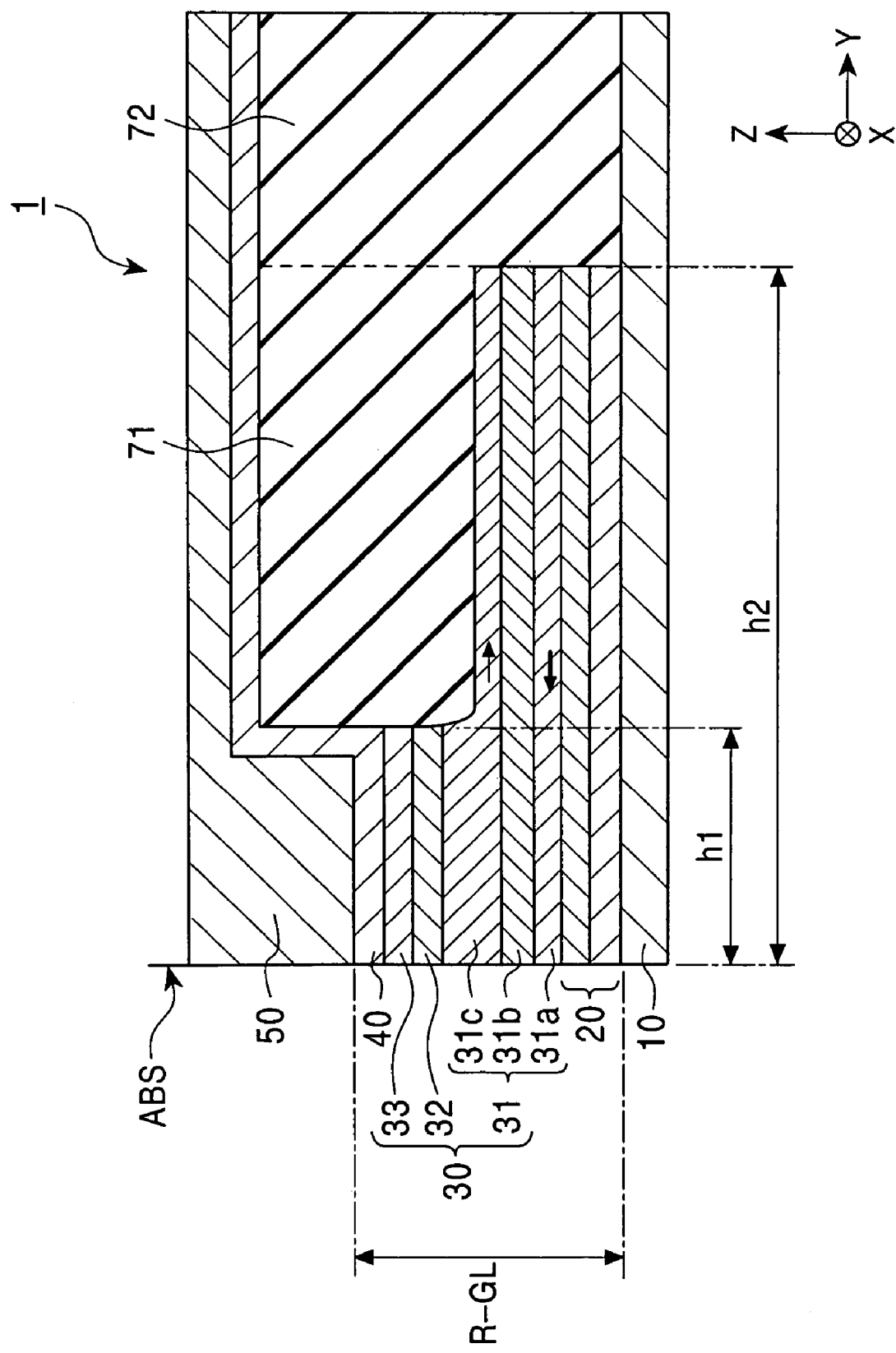
FIG. 1 is a partial sectional view showing the structure of a CPP giant magnetoresistive head (CPP-GMR head) according to a first embodiment of the present invention, taken along a central line of an element.
Figure 2:
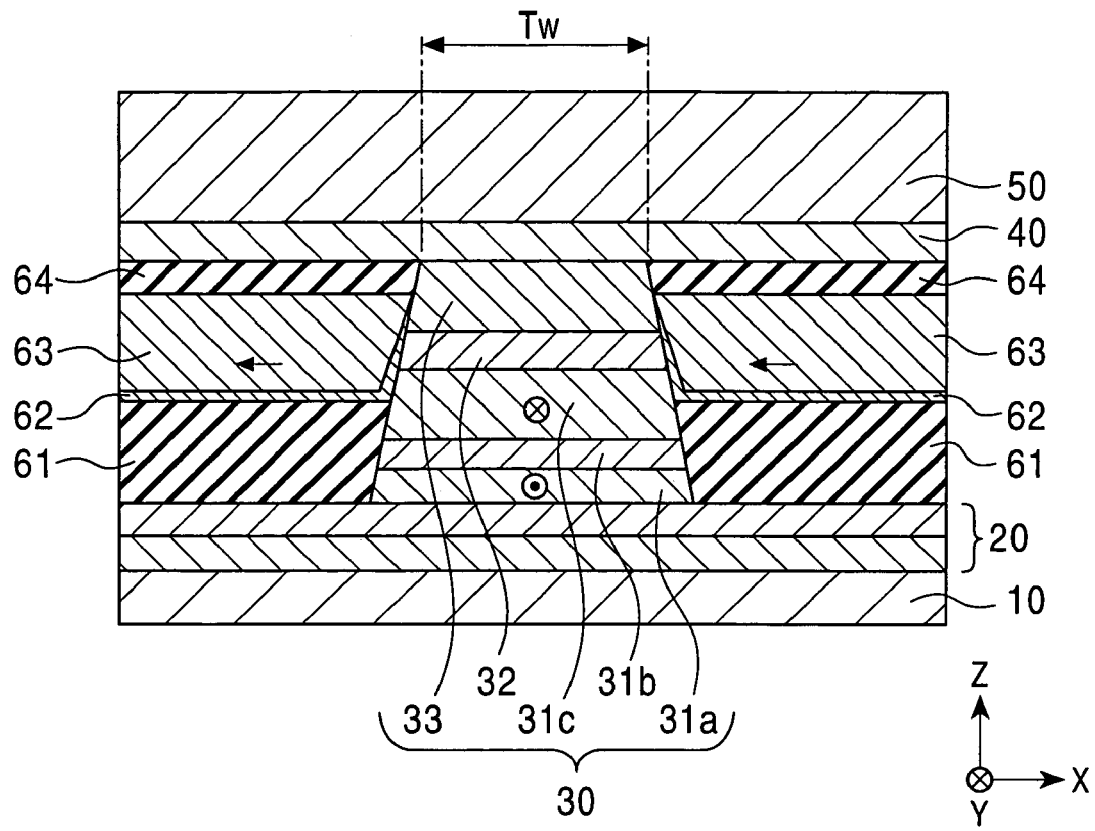
FIG. 2 is a partial sectional view showing the structure of the CPP giant magnetoresistive head shown in FIG. 1, as viewed from a surface facing a recording medium.
Figure 3:
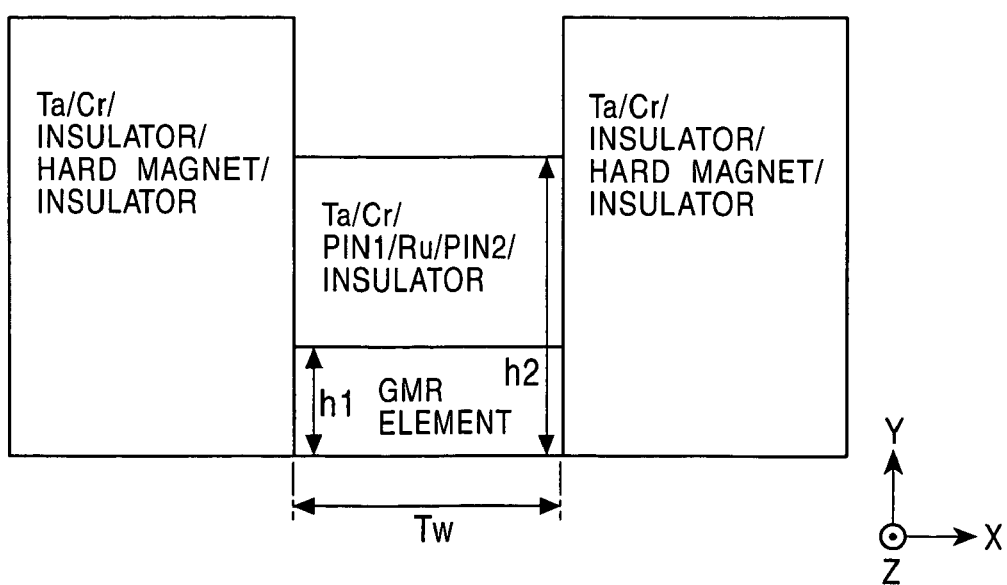
FIG. 3 is a schematic top plan view of the GMR element shown in FIG. 1.

FIGS. 1 to 8 show a CPP giant magnetoresistive head (CPP-GMR head) according to a first embodiment of the present invention. FIG. 1 is a partial sectional view showing the structure of a CPP GMR head 1, taken along a central line of an element, FIG. 2 is a partial sectional view showing the structure of the CPP GMR head 1, as viewed from a surface facing a recording medium, and FIG. 3 is a schematic top plan view of a GMR element 30.

The CPP-GMR head 1 comprises lower and upper shield layers 10 and 50 with a predetermined shield distance R-GL therebetween in the Z direction shown in the drawing, a lower large-area nonmagnetic metal film 20, the GMR element 30 exhibiting a giant magnetoresistive effect, and an upper large-area nonmagnetic metal film 40, the lower and upper large-area nonmagnetic metal films 20 and 40 and the GMR element 30 being disposed between the lower and upper shield layers 10 and 50.

Each of the lower and upper shield layers 10 and 50 functions as a magnetic shield and an electrode, and is formed in a sufficiently wider area than that of the GMR element 30, as shown in FIGS. 1 and 2. Each of the lower and upper shield layers 10 and 50 is formed to a thickness of about 1 μm by using a soft magnetic material such as NiFe or the like for obtaining a sufficient magnetic shield effect.

The lower large-area nonmagnetic metal film 20 functions as a gap layer formed directly on the lower shield layer 10, and also functions as an electrode and a seed layer for regularly forming the GMR element 30. The upper large-area nonmagnetic metal film 40 functions as a gap layer disposed just below the upper shield layer 50, and also functions as an electrode together with the upper shield layer 50.

The lower large-area nonmagnetic metal film 20 and the upper large-area nonmagnetic metal film 40 are in direct contact with the lower surface (a first pinned magnetic layer 31a) and the upper surface (a free magnetic layer 33), respectively, of the GMR element 30. As shown in FIGS. 1 and 2, each of the lower and upper large-area nonmagnetic metal films 20 and 40 has an area which is sufficiently larger than that of the GMR element 30 and substantially the same as that of the lower shield layer 10 and the upper shield layer 50.

Each of the lower and upper large-area nonmagnetic metal films 20 and 40 comprises a nonmagnetic metallic material having lower resistivity than that of the lower and upper shield layers 10 and 50. For example, each of the lower and upper large-area nonmagnetic metal films 20 and 40 preferably comprises at least one element of Au, Ag, Cu, Ru, Rh, Ir, Pd, Ni—Cr, (Ni—Fe)—Cr, and Cr. When the material contains Cr, the Cr content preferably exceeds 20 atomic percent. Each of the lower and upper large-area nonmagnetic metal films 20 and 40 may comprise a single film or a laminated film. In this embodiment, the lower large-area nonmagnetic metal film 20 comprises, for example, any one of Ta/Cu, Ta/Ru/Cu, Ta/Cr, Ta/Ni—Cr, Ta/(Ni—Fe)—Cr, and Cr, for causing the lower large-area nonmagnetic metal film 20 to function as a seed layer of the GMR element 30. In this embodiment, the lower large-area nonmagnetic metal film 20 is formed in a Ta/Cr two-layer structure.

Each of the lower and upper large-area nonmagnetic metal films 20 and 40 is formed to a thickness of ¼ or more of the shield distance R-GL. For example, when the shield distance R-GL is 480 Å to 800 Å, the thickness t20 or t40 of each of the lower and upper large-area nonmagnetic metal films 20 and 40 is preferably 60 Å to 300 Å. Within this thickness range, the resistivity of the large-area nonmagnetic metal films 20 and 40 can be decreased to about ⅕ to 1/10 of that of NiFe used as a material for forming the shield layers 10 and 50. Namely, the sheet resistance of the large-area nonmagnetic metal films 20 and 40 each having a thickness of 60 Å to 300 Å corresponds to the sheet resistance of a NiFe film having a thickness of 300 Å to 3000 Å. Therefore, the sensing current easily flows through the large-area nonmagnetic metal films 20 and 40 to relieve the concentration of the sensing current in the interfaces between the large-area nonmagnetic metal films 20 and 40 and the shield layers 10 and 50. Consequently, a resistance change due to the AMR effect of the lower and upper shield layers 10 and 50 can be suppressed to a low level. The thickness t20 of the lower large-area nonmagnetic metal film 20 may be the same as or different from that t40 of the upper large-area nonmagnetic metal film 40.

As shown in FIG. 2, the GMR element 30 is disposed at the substantially center of the shield layers 10 and 50 and the large-area nonmagnetic metal films 20 and 40 in the track width direction (the X direction shown in the drawing), and the GMR element 30 is sandwiched between the large-area nonmagnetic metal films 20 and 40 in the thickness direction. Since each of the large-area nonmagnetic metal films 20 and 40 is formed to a thickness of ¼ or more of the shield distance R-GL, the GMR element 30 is formed to a thickness of ¾ or less of the shield distance R-GL. The GMR element 30 comprises the pinned magnetic layer 31, the nonmagnetic layer 32 and the free magnetic layer 33, which are laminated on the lower large-area nonmagnetic metal film 20 in that order from below. However, the GMR element 30 does not include an antiferromagnetic layer for pinning the magnetization direction of the pinned magnetic layer 31. As shown in FIGS. 2 and 3, the lower large-area nonmagnetic metal film 20, the pinned magnetic layer 31, the nonmagnetic layer 32, the free magnetic layer 33 and the upper large-area nonmagnetic metal film 40 are exposed at the surface (ABS) facing the recording medium. In the GMR element 30, the free magnetic layer, the nonmagnetic layer and the pinned magnetic layer may be laminated in that order from below, which is opposite to the order in the embodiment shown in the drawings.

In this embodiment, the pinned magnetic layer 31 has a laminated ferrimagnetic structure comprising a first pinned magnetic layer 31a and a second pinned magnetic layer 31c each comprising a magnetic material, and a nonmagnetic intermediate layer 31b disposed therebetween and comprising a nonmagnetic material. The first pinned magnetic layer 31a, the nonmagnetic intermediate layer 31b and a portion of the second pinned magnetic layer 31c extend to the rear of the nonmagnetic layer 32 and the free magnetic layer 33 in the height direction, and the height dimension h2 is larger than the track width dimension Tw. When the dimension of the pinned magnetic layer 31 in the height direction is larger than the dimension in the track width direction, shape anisotropy occurs in each of the first and second pinned magnetic layers 31a and 31c in parallel with the height direction. The shape anisotropy stabilizes the magnetization direction of each of the first and second pinned magnetic layers 31a and 31c in a direction parallel to the height direction. In this embodiment, the magnetization direction of the first pinned magnetic layer 31a is aligned in the height direction so that the direction of the sensing current magnetic field is substantially the same as the direction of a synthetic magnetic moment of the first and second pinned magnetic layers 31a and 31c. The first and second pinned magnetic layers 31a and 31c have antiparallel magnetizations due to a RKKY interaction through the nonmagnetic intermediate layer 31b. Therefore, the magnetization direction of the second pinned magnetic layer 31c is aligned IR antiparallel to the height direction. In this embodiment, the magnetic moment per unit area (saturation magnetization Ms×thickness t) of the first pinned magnetic layer 31a is larger than that of the second pinned magnetic layer 31c, and thus the magnetization direction of the whole pinned magnetic layer 31 is the same as that of the first pinned magnetic layer 31a. In FIG. 1, the magnetization direction of the first pinned magnetic layer 31a is shown by a bold arrow, and the magnetization direction of the second pinned magnetic layer 31c is shown by a thin arrow.

Each of the layers of the pinned magnetic layer 31 comprises a magnetic material having a positive magnetostriction constant and is exposed at the surface facing the recording medium, as shown in FIG. 1. In this case, the symmetry of two-dimensional isotropic stress applied to the pinned magnetic layer 31 is broken to apply uniaxial tensile stress to the pinned magnetic layer 31 in parallel with the height direction. This inverse magnetostrictive effect stabilizes the magnetization direction of each of the first and second pinned magnetic layer 31a and 31c in a uniaxial direction parallel to the height direction.

Each of the first and second pinned magnetic layers 31a and 31c partially or entirely comprises Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $CO_2MnY$ (wherein Y is at least one element of Ge, Si, Sn, and Al). The thickness of each of the first and second pinned magnetic layers 31a and 31c is, for example, about 10 Å to 70 Å. The nonmagnetic intermediate layer 31b is formed to a thickness by using a material so as to produce the RKKY interaction between the first and second pinned magnetic layers 31a and 31c. In this embodiment, the nonmagnetic intermediate layer 31b is formed to a thickness of about 3 Å to 10 Å by using, for example, Ru. The pinned magnetic layer 31 may have a single-layer structure or a laminated structure comprising a magnetic film instead of the laminated ferrimagnetic structure.

The nonmagnetic layer 32 preferably comprises a conductive material with low electric resistance, and in this embodiment, the non magnetic layer 32 comprises, for example, Cu. The nonmagnetic layer 32 is formed to a thickness of about 25 Å, for example. The free magnetic layer 33 partially or entirely comprises Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or Co2MnY (wherein Y is at least one element of Ge, Si, Sn, and Al). The thickness of the free magnetic layer 33 is, for example, about 100 Å. Although the free magnetic layer 33 has a single-layer structure comprising ,a magnetic film, a laminated structure or laminated ferrimagnetic structure comprising magnetic films may be used. Furthermore hard bias layers 63 are in contact with both sides of the free magnetic layer 33 and the nonmagnetic layer 32, the hard bias layers 63 being magnetized in the track width direction. Also, a first or second insulating layer 61 or 64 with a thickness of several Å to several tens Å may be interposed between the GMR element 30 and each hard bias layer 63. The magnetization of the free magnetic layer 33 is aligned in the track width direction (the X direction) by a longitudinal bias magnetic field of each of the hard bias layers 63. In FIG. 2, the direction of the longitudinal bias magnetic field of each hard bias layer 63 is shown by an arrow.

The first insulating layers 61, bias underlying layers 62, the hard bias layers 63, and the second insulating layers 64 are laminated in that order from below on both sides of the GMR element 30 in the track width direction, and disposed between the large-area nonmagnetic metal films 20 and 40.

The first and second insulating layers 61 and 64 comprise an insulating material, for example, $Al_2O_3$, $SiO_2$, or the like to fill in each of the spaces between the hard bias layers 63 (and the hard bias underlying layers 62) and the large-area nonmagnetic metal films 20 and 40. Namely, the first insulating layers 61 are formed on the lower large-area nonmagnetic metal film 20 to have such a thickness that they contact parts of both sides of the free magnetic layer 33. The second insulating layers 64 are formed on the respective hard bias layers 63 to have such a thickness that they contact both sides of the pinned magnetic layer 31.

The hard bias underlying layers 62 are provided for improving the characteristics (coercive force Hc and remanence ratio S) of the hard bias layers 63 and increasing the bias magnetic fields produced from the hard bias layers 63. Each of the hard bias underlying layers 62 preferably comprises a metal film having a body-centered cubic structure (bcc structure). Specifically, each of the hard bias underlying layers 62 preferably comprises at least one element of Cr, W, Mo, V, Mn, Nb, and Ta. Although the hard bias underlying layers 62 are preferably formed only below the respective hard bias layers 63, they may be slightly interposed between both sides of the free magnetic layer 33 and the hard bias layers 63. The thickness of each of the hard bias underlying layers 62 formed between both sides of the free magnetic layer 33 and the hard bias layers 63 in the track width direction is preferably 1 nm or less. When the hard bias underlying layers 62 are interposed between the hard bias layers 63 and the free magnetic layer 33, the hard bias layers 63 can be magnetically connected to the free magnetic layer 33 to prevent a buckling phenomenon in which the ends of the free magnetic layer 33 are influenced by a demagnetizing field, thereby facilitating magnetic domain control of the free magnetic layer 33.

Figure 4:
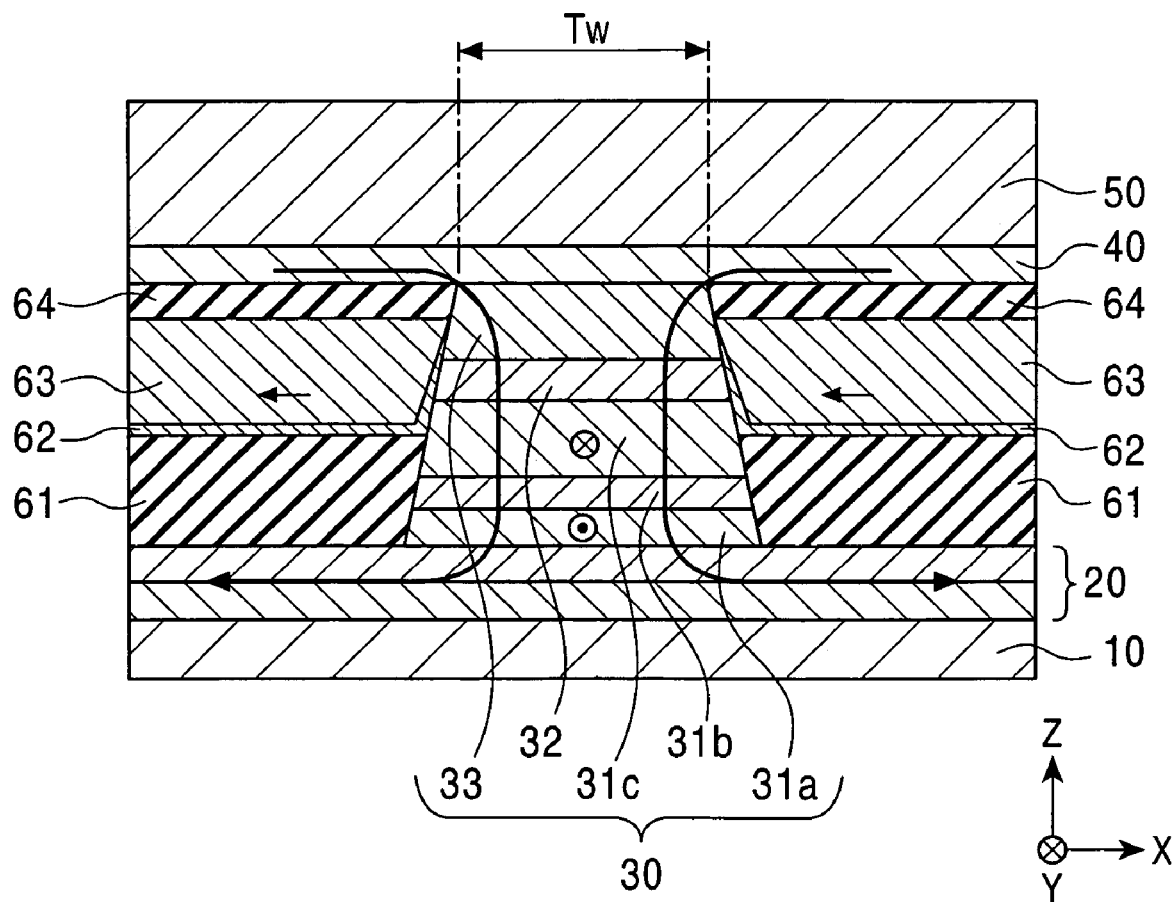
FIG. 4 is a conceptual view showing a current path produced by passing a sensing current from an upper shield layer to a lower shield layer.

In the CPP-GMR head 1 having the above-described whole structure, when the sensing current flows perpendicularly (in the thickness direction) to the film plane of the GMR element 30, a leakage magnetic field from the recording medium can be detected by using the giant magnetoresistive effect of the GMR element 30. In FIG. 4, an arrow shows a current path produced by passing the sensing current from the upper shield layer 50 to the lower shield layer 10.

As shown in FIG. 4, the sensing current supplied to the upper shield layer 50 mostly flows into the upper large-area nonmagnetic metal film 40 having lower resistivity than that of the upper shield layer 50. The sensing current flowing into the upper large-area nonmagnetic metal film 40 flows through the upper large-area nonmagnetic metal film 40 in parallel with the film plane because the upper large-area nonmagnetic metal film 40 is present in a wider area than that of the GMR element 30, and the sensing current flows from the interface between the upper large-area nonmagnetic metal film 40 and the pinned magnetic layer 31 to the GMR element 30 perpendicularly to the film plane (in the thickness direction). Then, the sensing current flows into the lower large-area nonmagnetic metal film 20 from the interface between the free magnetic layer 33 and the lower large-area nonmagnetic metal film 20. The sensing current flowing into the lower large-area nonmagnetic metal film 20 is mostly flows through the lower large-area nonmagnetic metal film 20 with lower resistivity in parallel with the film plane because the lower large-area nonmagnetic metal film 20 has lower resistivity than that of the lower shield layer 10 and is present in a wider area than that of the GMR element 30. The sensing current little flows through the lower shield layer 10 disposed below the GMR element 30.

In this current path, the sensing current is not concentrated above or below the range in which the GMR element 30 is formed. Namely, the current density at each of the interfaces between the large-area nonmagnetic metal films 20 and 40 and the shield layers 10 and 50 is decreased to suppress noise (resistance change of the shield layers 10 and 50) due to the AMR effect of the shield layers 10 and 50 even when the AMR effect occurs. When the sensing current is passed from the lower shield layer 10 to the upper shied layer 50, the same current path as shown in FIG. 4 can be formed except that the sensing current flows in the opposite direction.

Figure 21:
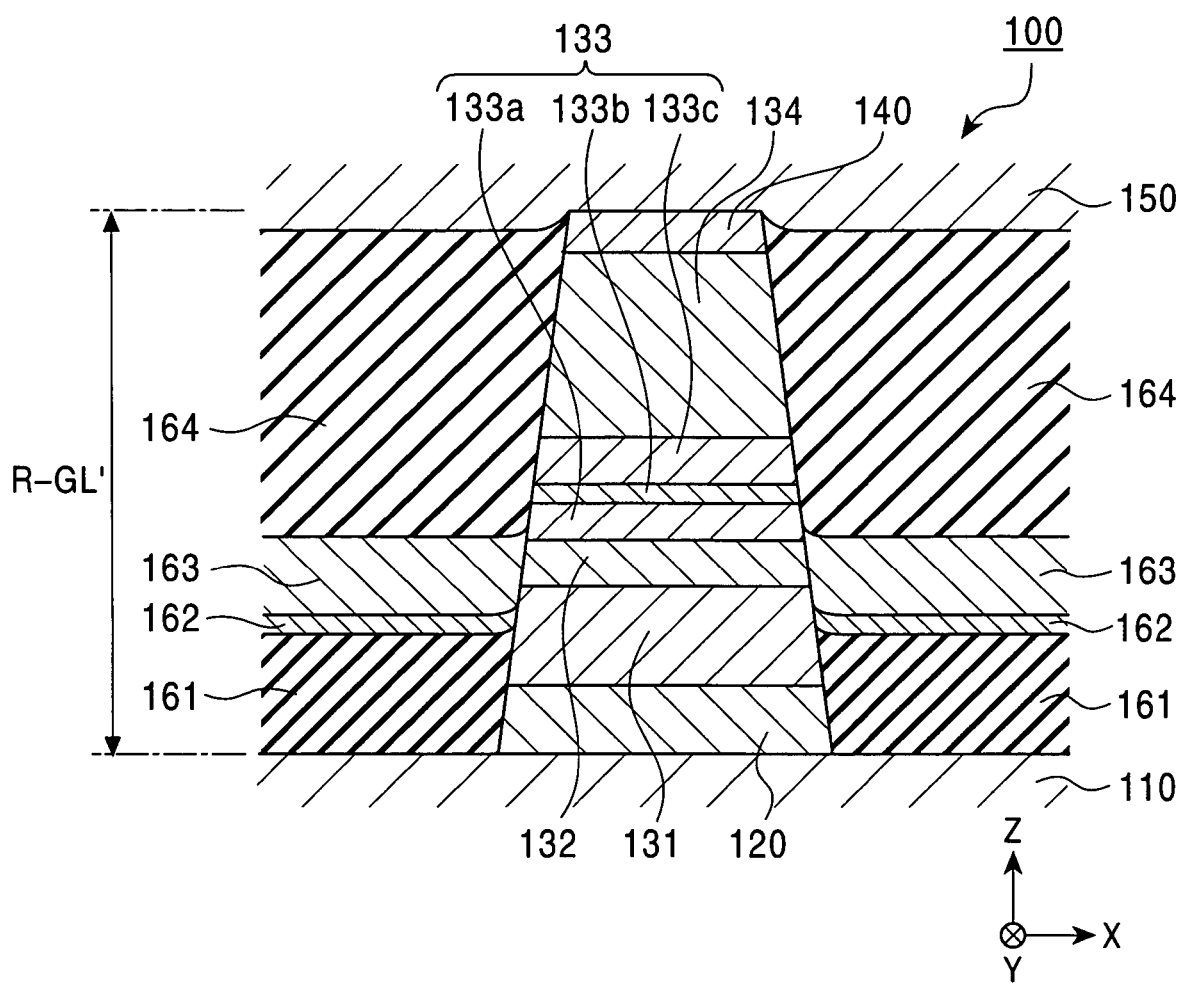
FIG. 21 is a longitudinal sectional view showing the structure of a conventional CPP giant magnetoresistive head, as viewed from a surface facing a recording medium.

As described above, in the CPP-GMR head 1, the magnetization direction of the pinned magnetic layer is stabilized in the height direction by the shape anisotropy, the inverse magnetoresistive effect and the seed effect of the lower large-area nonmagnetic metal film 20 without using the antiferromagnetic layer provided for pinning the magnetization direction of the pinned magnetic layer 31. Therefore, when the sensing current flows through the GMR element 30, the generated Joule heat is significantly decreased to suppress an increase in the element temperature, thereby improving reliability and the high-frequency characteristics of the head. Also, in this embodiment, the antiferromagnetic layer is not provided, and thus the shield distance R-GL can be decreased as compared with a conventional head. Furthermore, the upper and lower large-area nonmagnetic metal films 20 and 40 can be formed to larger thicknesses t20 and t40, respectively, as compared with the conventional head. As shown in FIG. 21, in the conventional head, the antiferromagnetic layer is formed thickly directly on the pinned magnetic layer, and thus the thickness of the nonmagnetic metal film cannot be sufficiently increased without increasing the shield distance R-GL'.

A method for manufacturing the CPP-GMR head 1 shown in FIGS. 1 to 3 according to an embodiment will be described below with reference to FIGS. 5 to 8.

In FIGS. 5 to 8, FIG. A is a partial sectional view showing a step for manufacturing the CPP-GMR head 1, as viewed from the surface facing the recording medium, and FIG. B is a partial sectional view showing a step for manufacturing the CPP-GMR head 1 taken along a central line of the element in parallel with the height direction. Since the material and thickness of each layer are the same as those of the completed CPP-GMR head 1, the description thereof is omitted.

First, the lower shield layer 10, the lower large-area nonmagnetic metal film 20, the first pinned magnetic layer 31a, the nonmagnetic intermediate layer 31b, the second pinned magnetic layer 31c, the nonmagnetic layer 32 and the free magnetic layer 33 are continuously deposited in a solid form in vacuum in that order from below. These layers are deposited by sputtering. In this step, the second pinned magnetic layer 31c is uniformly formed to the same thickness as that of an element portion of the completed second pinned magnetic layer 31c.

Next, a liftoff resist layer R1 is formed on the free magnetic layer 33 so as to cover an area substantially the same as or slightly smaller than the optical element area (track width dimension Tw and height dimension h1) of the GMR element 30 to be formed.

Figure 5A:
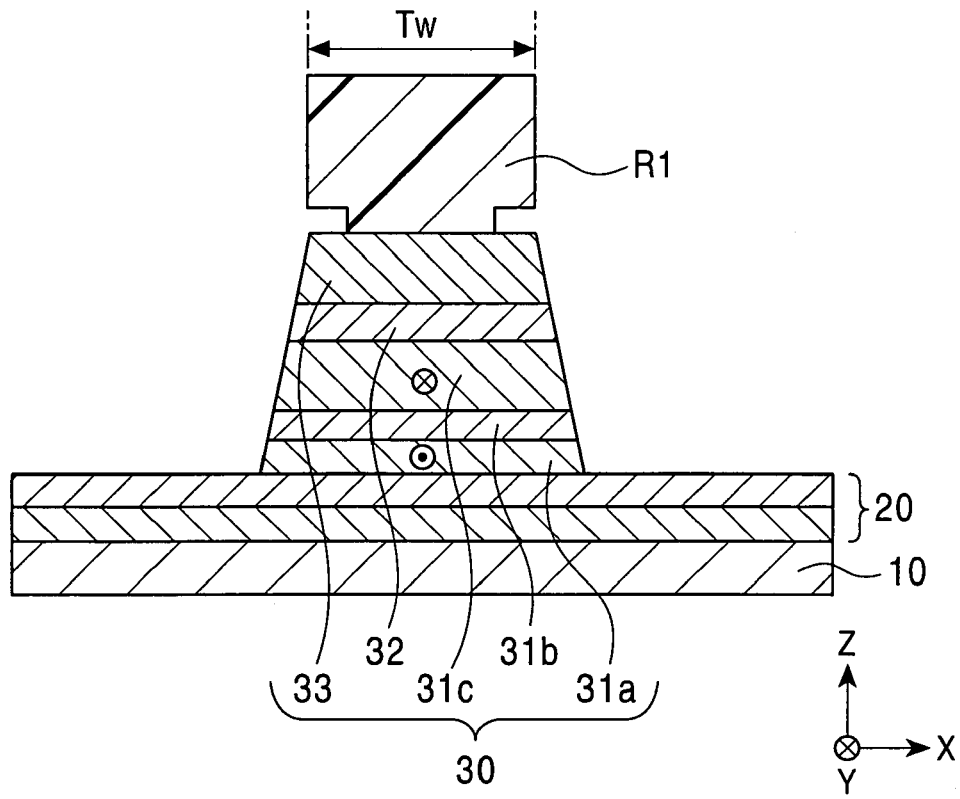
Figure 5B:
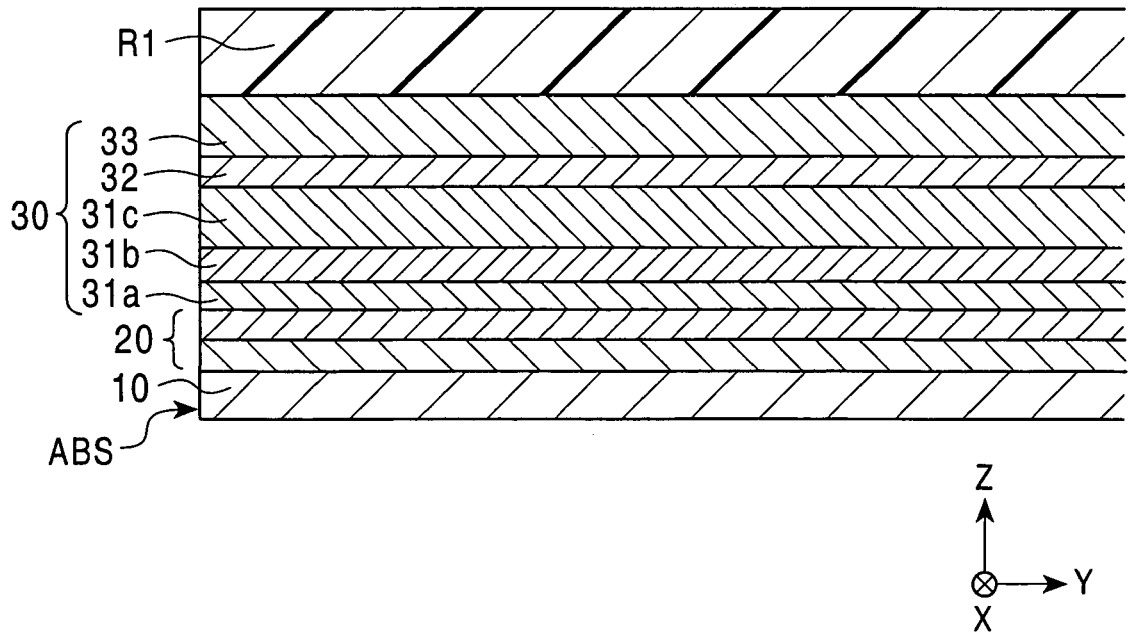

After the resist layer R1 is formed, portions of the layers ranging from the free magnetic layer 33 to the first pinned magnetic layer 31a (the free magnetic layer 33, the nonmagnetic layer 32, the second pinned magnetic layer 31c, the nonmagnetic intermediate layer 31b, and the first pinned magnetic layer 31a), which are not covered with the resist layer R1, are removed by, for example, ion milling or the like. The ion milling is stopped when the lower large-area nonmagnetic metal film 20 is exposed. In this step, as shown in FIG. 5, the GMR element 30 having a substantially trapezoidal shape and comprising layers ranging from the first pinned magnetic layer 31a to the free magnetic layer 33 is left at the substantially center of the lower large-area nonmagnetic metal film 20 in the track width direction. Since the substances removed by ion milling partially re-adhere to both sides of the GMR element 30, the re-adhering substances are preferably removed by milling again.

Figure 6A:
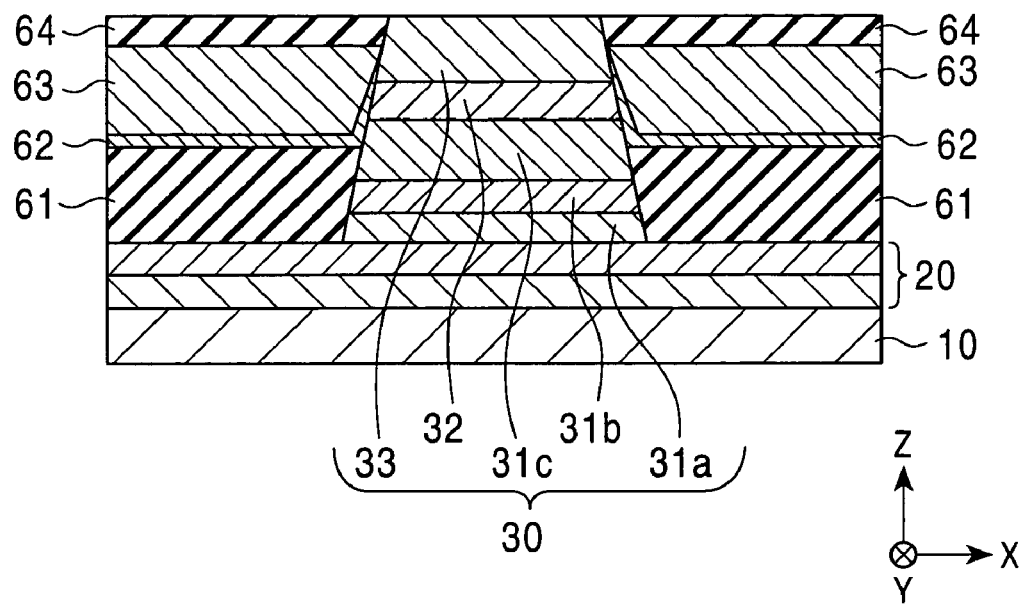
Figure 6B:
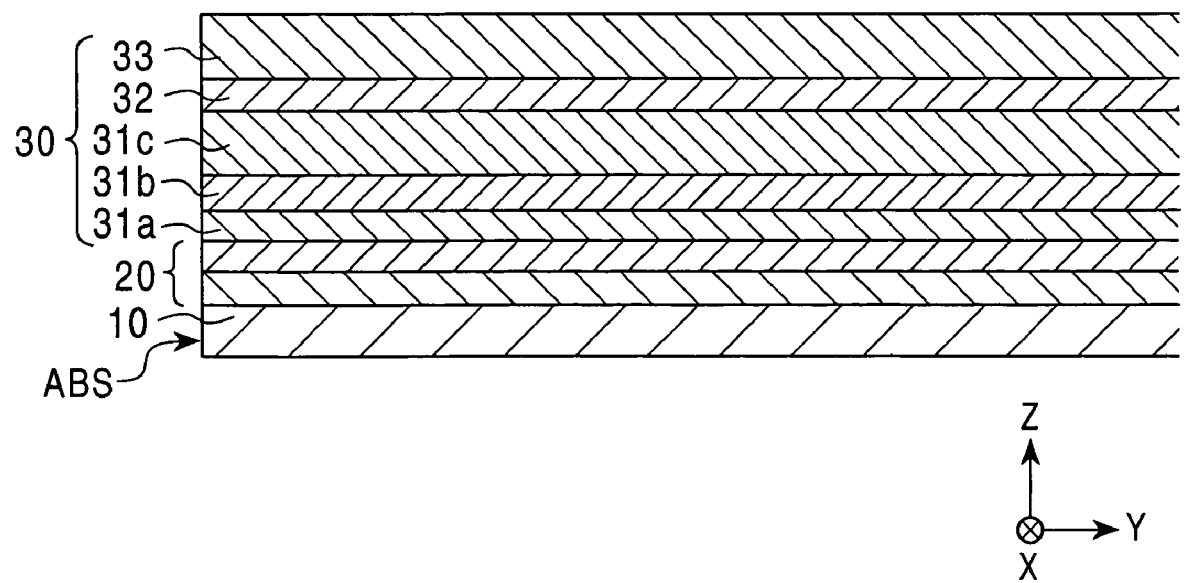

Then, with the resist layer R1 remaining, the first insulating layers 61, the bias underlying layers 62, the hard bias layers 63 and the second insulating layers 64 are continuously deposited by sputtering on both sides of the GMR element 30. These layers are deposited by sputtering. In sputtering deposition, the angle of sputtered particles is preferably about 90 degrees with the lower large-area nonmagnetic metal film 20. After sputtering deposition, the resist layer R1 is removed. FIG. 6 shows the state after the removal of the resist layer R1.

Figure 7A:
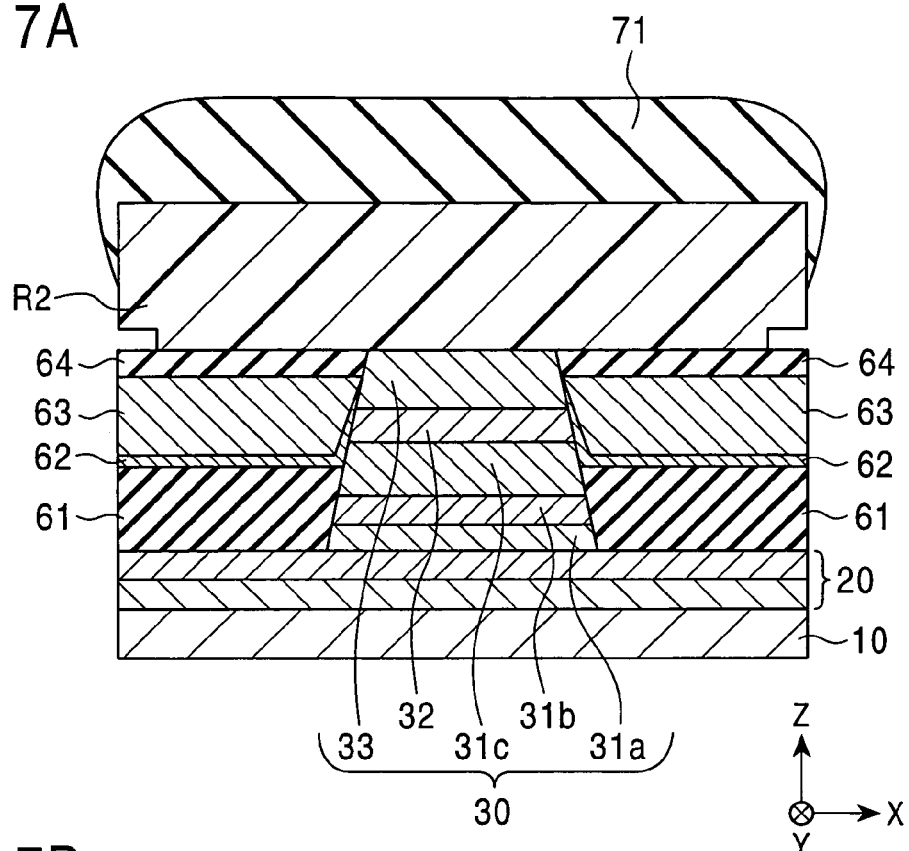
Figure 7B:
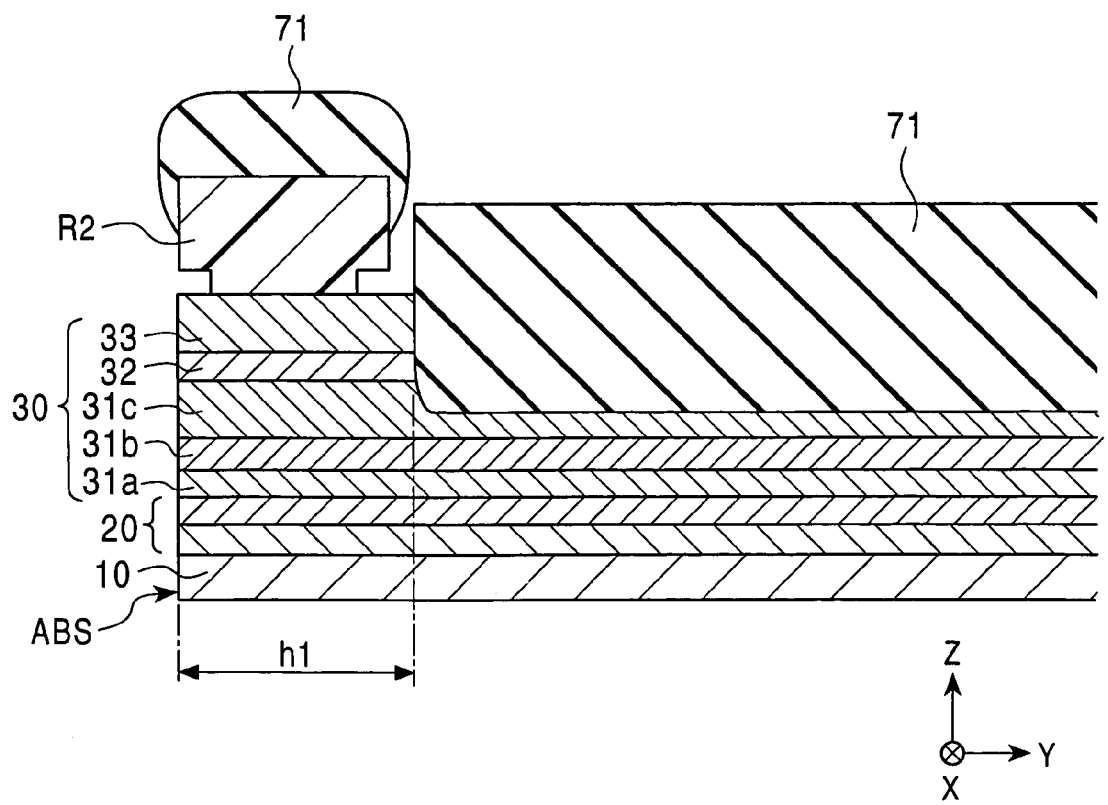

After the resist layer R1 is removed, as shown in FIG. 7, a resist layer R2 is formed on the free magnetic layer 33, for determining the height dimension h1 of the GMR element 30 to be formed.

Then, as shown in FIG. 7, portions of the free magnetic layer 33, the nonmagnetic layer 32, and a part of the second pinned magnetic layer 31c, which are not covered with the resist layer R2, are removed by, for example, ion milling, and a first backfill gap layer 71 is deposited in the removed portion. In the ion milling step, the free magnetic layer 33 and the nonmagnetic layer 32 are left only in the element portion used as the GMR element 30, and a part of the second pinned magnetic layer 31c, the nonmagnetic intermediate layer 31b and the first pinned magnetic layer 31a are left to extend to the rear of the free magnetic layer 33 and the nonmagnetic layer 32 in the height direction. The rear end surfaces of the free magnetic layer 33, the nonmagnetic layer 32 and a part of the second pinned magnetic layer 31c in the height direction are smoothly continued. In the second pinned magnetic layer 31c, a portion (rear portion extending in the height direction) outside the element portion has a smaller thickness than that in the element portion.

After the first backfill gap layer 71 is deposited, the resist layer R2 is removed by liftoff.

Figure 8A:
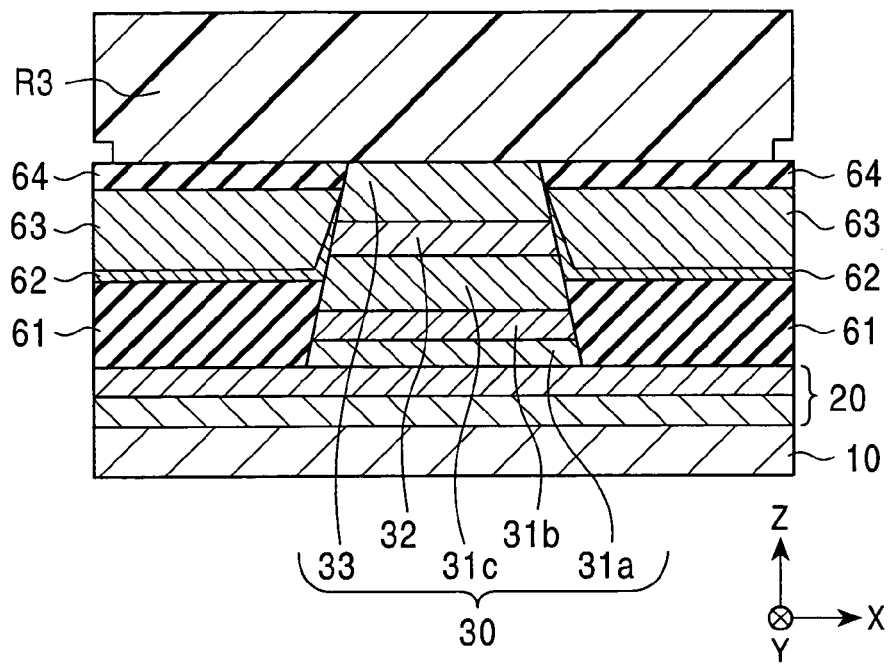
Figure 8B:
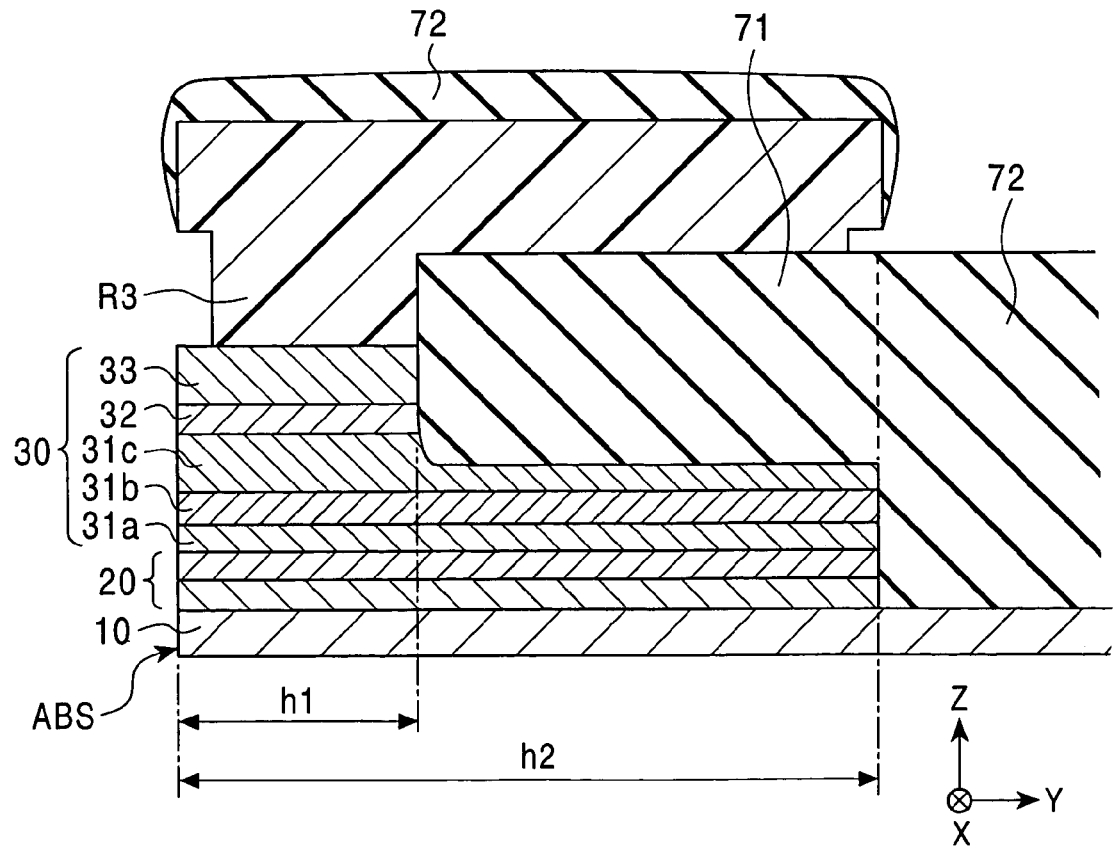

After the resist layer R2 is removed, as shown in FIG. 8, a resist layer R3 is formed over the free magnetic layer 33 and the first backfill gap layer 71, for determining the height dimension h2 of the second pinned magnetic layer 31c, the nonmagnetic intermediate layer 31b and the first pinned magnetic layer 31a. The height dimension h2 is set to be larger than the track width dimension Tw and the height dimension h1 of the GMR element 30. The dimension of the resist layer R3 is larger than that of the resist layer R2 in the height direction.

Then, as shown in FIG. 8, portions of the layers ranging from the first backfill gap layer 71 to at least the first pinned magnetic layer 31a, which are not covered with the resist layer R3, are removed by, for example, ion milling. In this embodiment, portions of the first backfill gap layer 71, a portion of the second pinned magnetic layer 31c, the nonmagnetic intermediate layer 31b, the first pinned magnetic layer 31a, and the lower large-area nonmagnetic metal film 20, which are not covered with the resist layer R3, are removed to expose the lower shield layer in the removed portion. Then, as shown in FIG. 8, the second backfill gap layer 72 is deposited on the exposed portion of the lower shield layer 10. After the second backfill gap layer 72 is deposited, the resist layer R3 is removed by liftoff.

Then, the upper large-area nonmagnetic metal film 40 is deposited over the free magnetic layer 33, the second insulating layers 64, the first backfill gap layer 71 and the second backfill gap layer 72 by sputtering, and the upper surfaces of the upper large-area nonmagnetic metal film 40 is subjected to CMP or ion milling. In the CMP or ion milling, the upper surface of the upper large-area nonmagnetic metal film 40 is planarized. The flatness of the upper large-area nonmagnetic metal film 40 is secured in laminating a recording inductive head on the upper shield layer 50. The thickness t40 of the upper large-area nonmagnetic metal film 40 after CMP is the same as that of the completed CPP-GMR head 1.

Then, the upper shield layer 50 is deposited by sputtering on the planarized upper large-area nonmagnetic metal film 40. The upper shield layer 50 may be deposited by sputtering in succession to the upper large-area nonmagnetic metal film 40 during the deposition of the upper large-area nonmagnetic metal film 40.

The CPP-GMR head 1 shown in FIG. 1 is completed by the above-described steps.

FIGS. 9 to 13 show a CPP giant magnetoresistive head (CPP-GMR head) according to a second embodiment of the present invention. The second embodiment is different from the first embodiment in that an antiferromagnetic layer is provided in the rear of a GMR element in the height direction, for pinning the magnetization direction of a pinned magnetic layer in the height direction.

Figure 9:
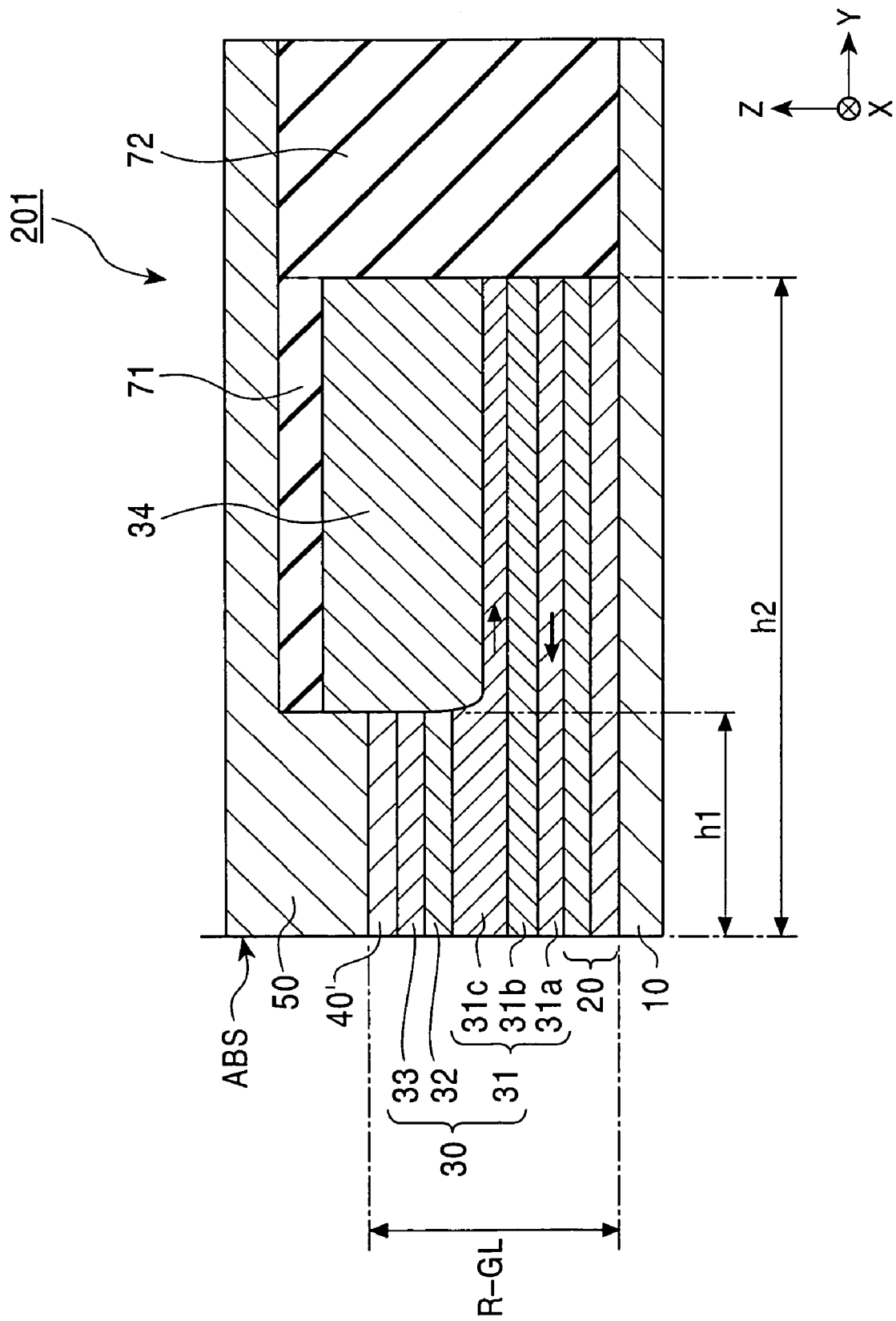
FIG. 9 is a partial sectional view showing the structure of a CPP giant magnetoresistive head according to a second embodiment of the present invention, taken along a central line of an element.
Figure 10:
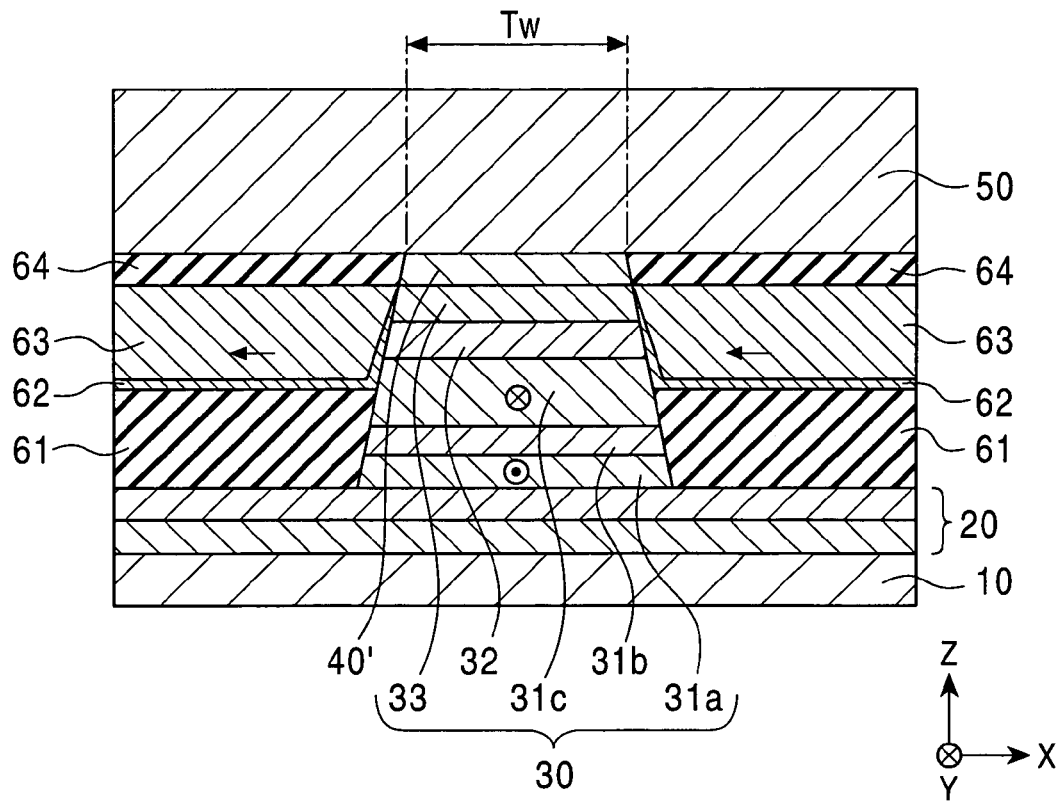
FIG. 10 is a partial sectional view showing the structure of the CPP giant magnetoresistive head shown in FIG. 9, as viewed from a surface facing a recording medium.
Figure 11:
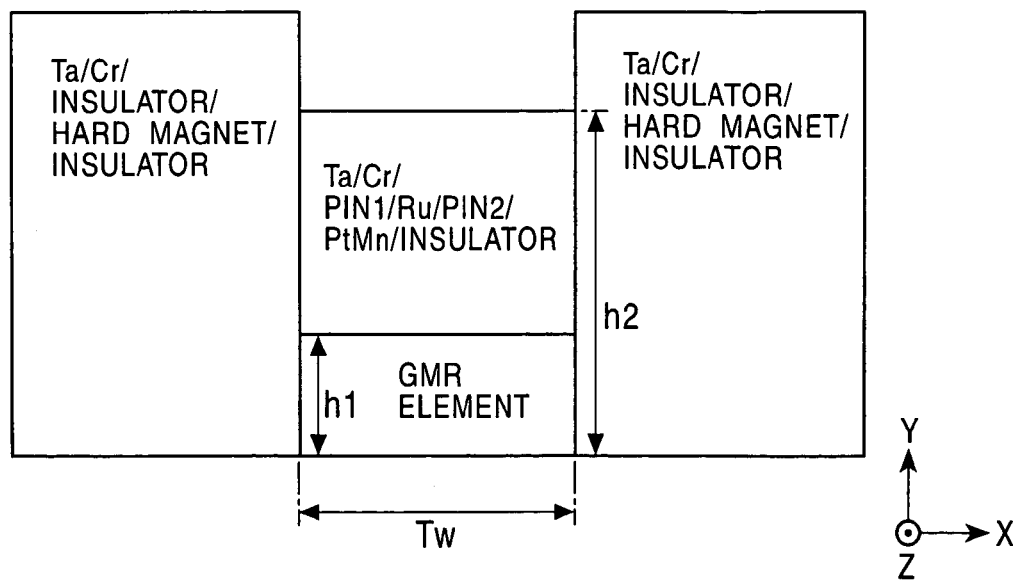
FIG. 11 is a schematic top plan view showing the GMR element shown in FIG. 9.

FIG. 9 is a partial sectional view showing the structure of a CPP GMR head 201, taken along a central line of an element, FIG. 10 is a partial sectional view showing the structure of the CPP GMR head 201, as viewed from a surface facing a recording medium, and FIG. 11 is a schematic top plan view of a GMR element 30. In FIGS. 9 to 11, the functions, shapes, materials and thicknesses of layers denoted by the same reference numerals as those in the first embodiment shown in FIGS. 1 to 3 are the same as those in the first embodiment, and thus the description thereof is omitted.

The CPP-GMR head 201 comprises an antiferromagnetic layer 34 provided outside the GMR element 30, strictly in the rear of the GMR element 30 in the height direction, for pinning the magnetization direction of the pinned magnetic layer 31. In other words, the antiferromagnetic layer 34 is formed on a rear portion of the second pinned magnetic layer 31c which extends in the height direction, to made contact with the rear end surfaces of an upper nonmagnetic metal film 40', the free magnetic layer 33, the nonmagnetic layer 32 and a part of the second pinned magnetic layer 31c in the height direction. The antiferromagnetic layer 34 produces an exchange coupling magnetic field at the interface with the second pinned magnetic layer 31c so that the magnetization direction of the second pinned magnetic layer 31c is pinned in the height direction by the exchange coupling magnetic field. The first and second pinned magnetic layers 31a and 31c have antiparallel magnetizations due to a RKKY interaction through the nonmagnetic intermediate layer 31b. Therefore, the magnetization direction of the first pinned magnetic layer 31a is pinned in antiparallel to the height direction. In the second embodiment, the magnetic moment per unit area (saturation magnetization Ms×thickness t) of the first pinned magnetic layer 31a is larger than that of the second pinned magnetic layer 31c, and thus the magnetization direction of the whole pinned magnetic layer 31 is the same as that of the first pinned magnetic layer 31a. In FIG. 9, the magnetization direction of the first pinned magnetic layer 31a is shown by a bold arrow, and the magnetization direction of the second pinned magnetic layer 31c is shown by a thin arrow.

The antiferromagnetic layer 34 preferably comprises an antiferromagnetic material containing Mn and element Z (element Z is at least one element of Pt, Pd, Ir, Rh, Ru, and Os), or an antiferromagnetic material containing Mn and elements Z and Z' (element Z' is at least one element of Ne, Ar, Kr, Xe, Be, B, C, N, Mg, Al, Si, P, Ti, V, Cr, Fe, Co, Ni, Cu, Zn, Ga, Ge, Zr, Nb, Mo, Ag, Cd, Sn, Hf, Ta, W, Re, Au, Pb, and the rare earth elements). Such an antiferromagnetic material has excellent corrosion resistance and a high blocking temperature, and produces a great exchange coupling magnetic field at the interface between the antiferromagnetic layer 34 and the second pinned magnetic layer 31c. The antiferromagnetic layer 34 is preferably formed to a thickness of 80 Å to 300 Å. In this embodiment, the thickness of the antiferromagnetic layer 34 is about 150 Å.

Furthermore, the first backfill gap layer (insulating layer) 71 comprising an insulating material such as $Al_2O_3$ or $SiO_2$ is formed between the antiferromagnetic layer 34 and the upper shield layer 50, for preventing the sensing current from flowing to the antiferromagnetic layer 34. As shown in FIG. 10, the first backfill gap layer 71, the antiferromagnetic layer 34, the second pinned magnetic layer 31c, the nonmagnetic intermediate layer 31b, the first pinned magnetic layer 31a and the lower large-area nonmagnetic metal film 20 have the respective rear end surfaces at the same position in the height direction. In the rear of the first backfill gap layer 71, the antiferromagnetic layer 34, the second pinned magnetic layer 31c, the nonmagnetic intermediate layer 31b, the first pinned magnetic layer 31a and the lower large-area nonmagnetic metal film 20 in the height direction, the space between the lower shield layer 10 and the upper shield layer 50 is filled with a second backfill gap layer (insulating layer) 72 comprising an insulating material such as $Al_2O_3$ or $SiO_2$.

In the second embodiment, the upper nonmagnetic metal film 40' is formed on the free magnetic layer 33 in the same area as that of the free magnetic layer 33. Like the upper large-area nonmagnetic metal film 40 of the first embodiment, the upper nonmagnetic metal film 40' has the function to relieve the concentration of the sensing current in the upper shield layer 50.

A method for manufacturing the CPP-GMR head 201 shown in FIGS. 9 to 11 according to an embodiment will be described below with reference to FIGS. 12 and 13.

Figure 12A:
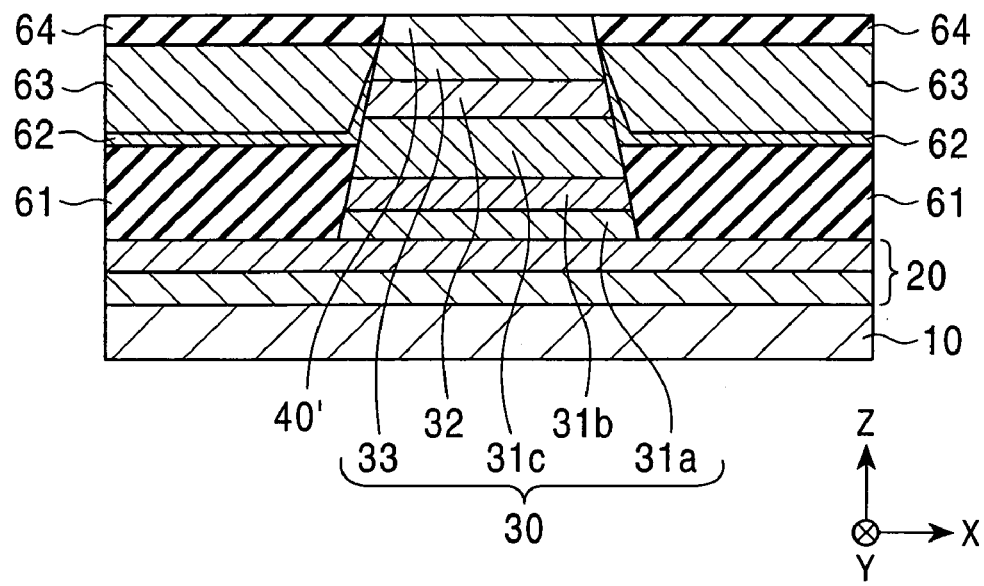
Figure 12B:
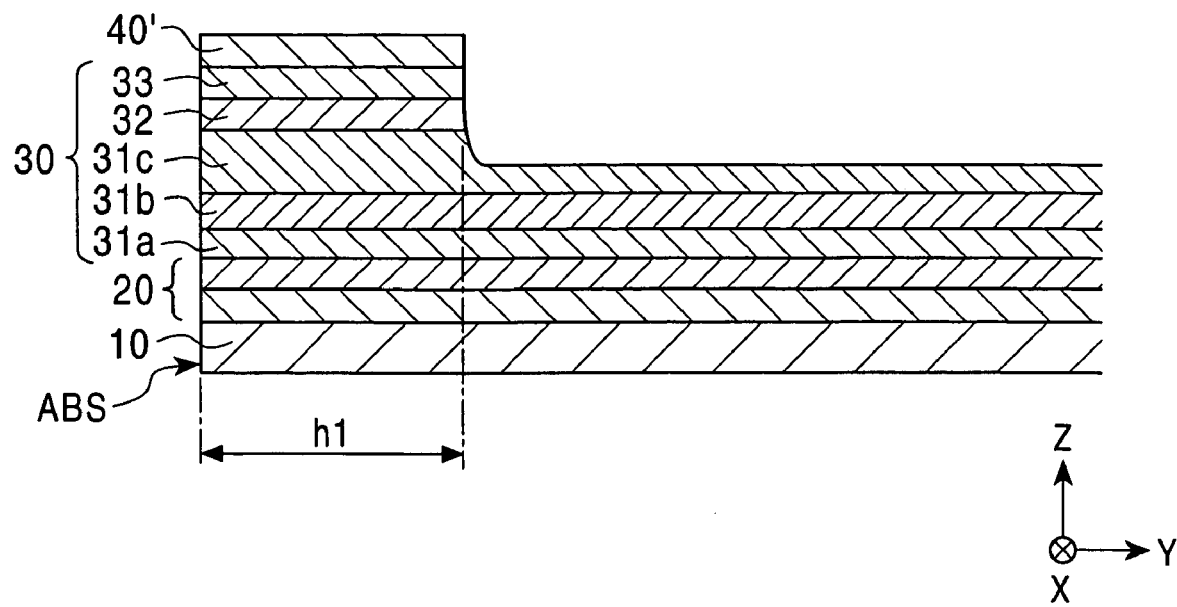
Figure 13A:
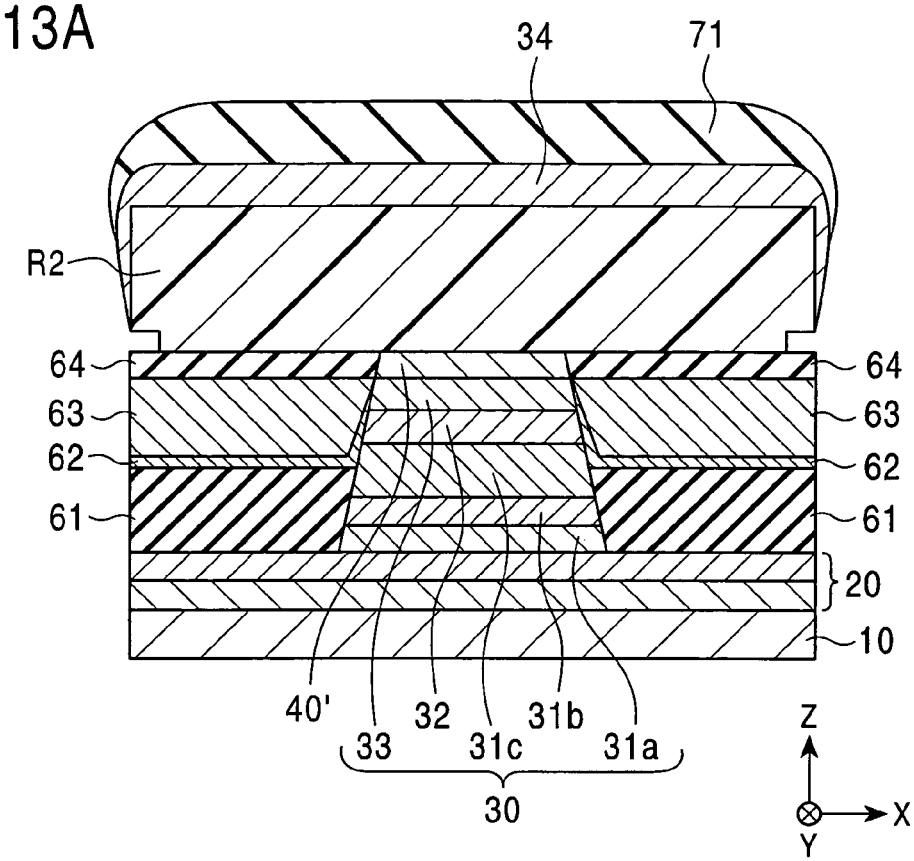
Figure 13B:
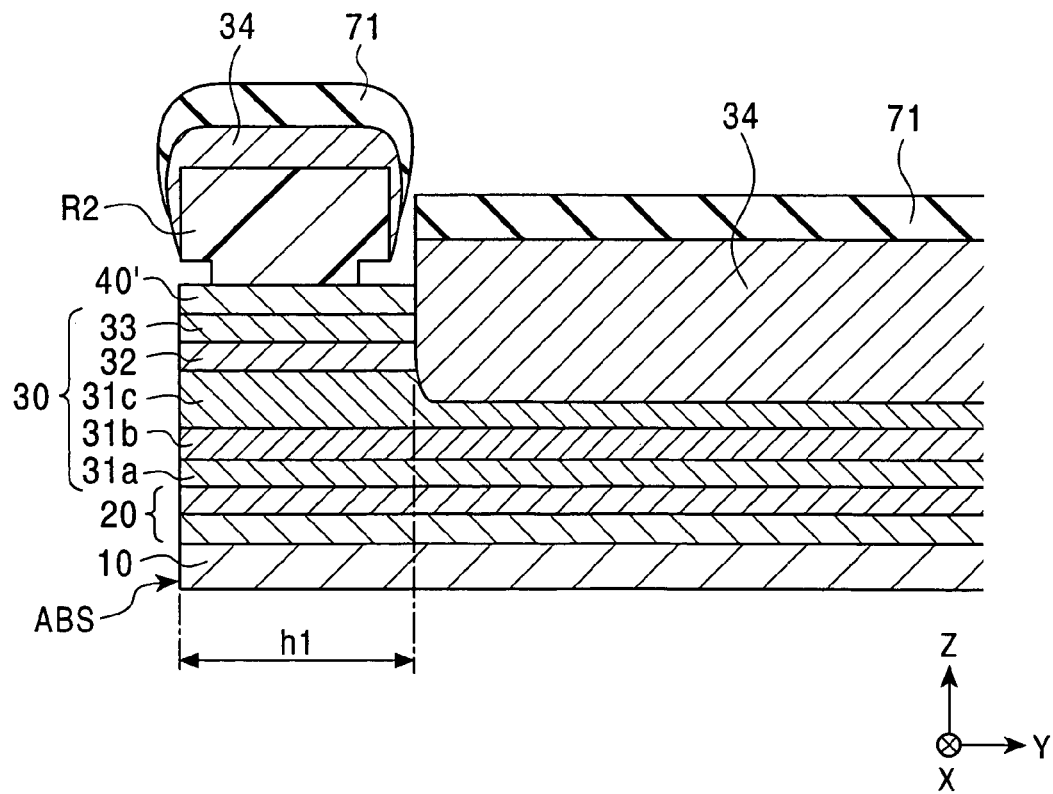

In FIGS. 12 and 13, FIG. A is a partial sectional view showing a step for manufacturing the CPP-GMR head 201, as viewed from the surface facing the recording medium, and FIG. B is a partial sectional view showing a step for manufacturing the CPP-GMR head 201 taken along a central line of the element in parallel with the height direction. The material and thickness of each layer are the same as those of the completed CPP-GMR head 201.

In the manufacturing method, the steps before the first backfill gap layer 71 is formed, i.e., the steps up to the step of removing portions of the upper nonmagnetic metal film 40', the free magnetic layer 33, the nonmagnetic layer 32, and a part of the second pinned magnetic layer 31c, which are not covered with the resist layer R2, are the same as in the first embodiment. FIG. 12 shows the state immediately after portions of the upper nonmagnetic metal film 40', the free magnetic layer 33, the nonmagnetic layer 32, and a part of the second pinned magnetic layer 31c, which are not covered with the resist layer R2, are removed by, for example, ion milling. In this state, the upper nonmagnetic metal film 40', the free magnetic layer 33 and the nonmagnetic layer 32 are left only in the element portion used as the GMR element 30, and a part of the second pinned magnetic layer 31c, the nonmagnetic intermediate layer 31b and the first pinned magnetic layer 31a are left to extend to the rear of the free magnetic layer 33 and the nonmagnetic layer 32 in the height direction. The rear end surfaces of the upper nonmagnetic metal film 40', a part of the upper shield layer 50, the free magnetic layer 33, the nonmagnetic layer 32, and a part of the second pinned magnetic layer 31c in the height direction are smoothly continued. In the second pinned magnetic layer 31c, a portion (rear portion extending in the height direction) outside the element has a smaller thickness than that of a portion within the element. For example, the thickness of the portion within the element portion is about 50 Å, and the thickness of the portion outside the element is about 40 Å.

After the portions of the layers ranging from the upper nonmagnetic metal film 40' to a part of the second pinned magnetic layer 31c, which are not covered with the resist layer R2, are removed, the antiferromagnetic layer 34 and the first backfill gap layer 71 are deposited in the removed portion, as shown in FIG. 13. After the first backfill gap layer 71 is deposited, the resist layer R2 is removed by liftoff. After the resist layer R2 is removed, in the same step as in the first embodiment, the height dimension h2 of the second pinned magnetic layer 31c, the nonmagnetic intermediate layer 31b and the first pinned magnetic layer 31a is determined, and the second backfill gap layer 72 is deposited.

After the second backfill gap layer 72 is deposited, annealing is performed in a magnetic field in the height direction. For example, the annealing temperature is about 270° C., and the magnitude of the applied magnetic field is about 800 kA/m. In the annealing in the magnetic field, at least a portion of the antiferromagnetic layer 34 is transformed from a disordered lattice to an ordered lattice to exhibit antiferromagnetic characteristics. Namely, an exchange coupling magnetic field occurs between the antiferromagnetic layer 34 and the second pinned magnetic layer 31c. The magnetization direction of the second pinned magnetic layer 31c is pinned by the produced exchange coupling magnetic field in the height direction, and the magnetization direction of the first pinned magnetic layer 31a is pinned in antiparallel to the height direction. In FIG. 9, the magnetization direction of each of the first and second pinned magnetic layers 31a and 31c is shown by an arrow.

In this embodiment, the antiferromagnetic layer 34 is in contact with the upper surface of the rear portion of the second pinned magnetic layer 31c which extends in the height direction, and thus a contact area (an area where an exchange coupling magnetic field occurs) can be sufficiently secured between the antiferromagnetic layer 34 and the second pinned magnetic layer 31c to strongly pin magnetization of the second pinned magnetic layer 31c. Therefore, magnetization of the first pinned magnetic layer 31a is also strongly pinned through the nonmagnetic intermediate layer 31b.

After the annealing, the upper shield layer 50 is deposited over the upper nonmagnetic metal film 40', the second insulating layers 64, the first backfill gap layer 71 and the second backfill gap layer 72. The upper nonmagnetic metal film 40' may be deposited immediately before the deposition of the upper shield layer 50.

The CPP-GMR head 201 shown in FIGS. 9 to 11 is completed by the above-described steps.

Figure 14:
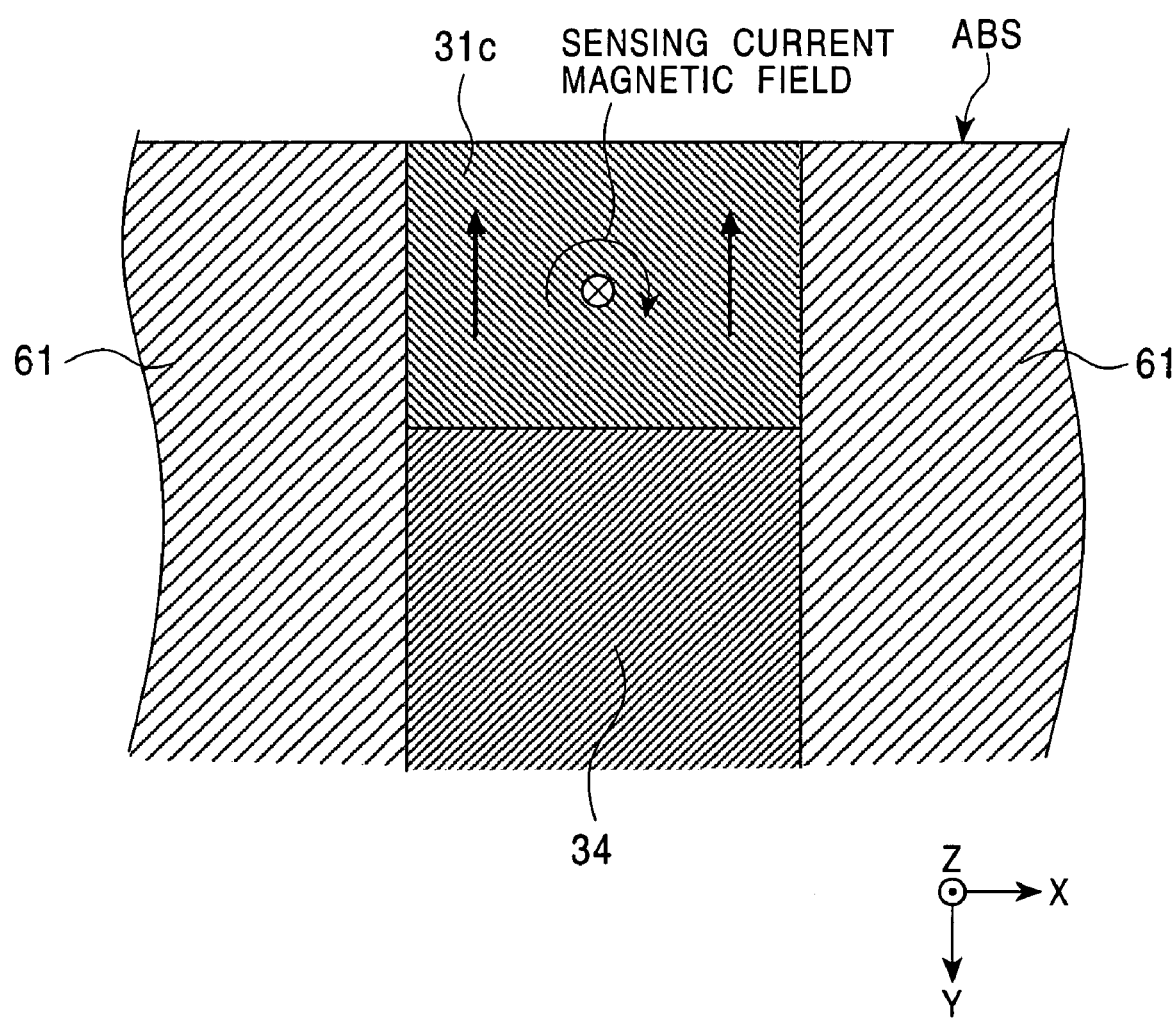
FIG. 14 is a schematic drawing illustrating the direction of a sensing current magnetic field and the direction of a synthetic magnetic moment of a pinned magnetic layer.

As described above, in the second embodiment, the antiferromagnetic layer 34 is provided in the rear of the GMR element (the nonmagnetic layer 32 and the free magnetic layer 33) in the height direction, and thus the magnetization direction of the pinned magnetic layer 31 is strongly pinned by the inverse magnetostrictive effect and shape anisotropy of the pinned magnetic layer 31, the seed effect of the lower large-area nonmagnetic metal film 20, and the exchange coupling magnetic field produced at the interface between the pinned magnetic layer 31 (the second pinned magnetic layer 31c) and the antiferromagnetic layer 34. Also, in the second embodiment, the antiferromagnetic layer 34 is provided in contact with the upper surface of the second pinned magnetic layer 31c, and thus a wide contact area (an area in which an exchange coupling magnetic field occurs) can be secured between the second pinned magnetic layer 31c and the antiferromagnetic layer 34, thereby more strongly pinning magnetization of the pinned magnetic layer 31. In this way, when magnetization of the pinned magnetic layer 31 is strongly pinned, magnetization of the pinned magnetic layer 31 is not fluctuated by the generated sensing current magnetic field even if the direction of the sensing current magnetic field is not the same as that of the synthetic magnetic moment of the first and second pinned magnetic layers 31a and 31c. Therefore, the sensing current density can be increased to increase output. For example, when the sensing current flows through the GMR element 30 from the upper shield layer 50 to the lower shield layer 10 perpendicularly (in the thickness direction) to the film plane, a clockwise sensing current magnetic field occurs, as shown by a thin arrow in FIG. 14. In order to more strongly pin the magnetization of the pinned magnetic layer 31, the direction of the sensing current magnetic field is preferably the same as that (shown by a bold arrow in FIG. 14) of the synthetic magnetic moment of the first and second pinned magnetic layers 31a and 31c.

In the second embodiment, the antiferromagnetic layer 34 is disposed in the rear of the GMR element 30 in the height direction, and thus the antiferromagnetic layer 34 is separated from the current path in which the sensing current flows. Therefore, even when the sensing current is passed through the GMR element 30, the antiferromagnetic layer 34 does not generate heat to significantly decrease the heat generation from the GMR element 30 during the operation. As a result, an increase in the element temperature is suppressed to improve reliability. In the second embodiment, the upper surface of the antiferromagnetic layer 34 is positioned above the upper surface of the GMR element 30. However, the upper surface of the antiferromagnetic layer 34 is covered with the first backfill gap layer 71, and thus the sensing current little flows through the antiferromagnetic layer 34, thereby decreasing a shunt loss and improving reproduction output. Furthermore, the shield distance R-GL at the surface facing the recording medium can be decreased in comparison to the conventional head shown in FIG. 21, thereby improving resolution.

Figure 15:
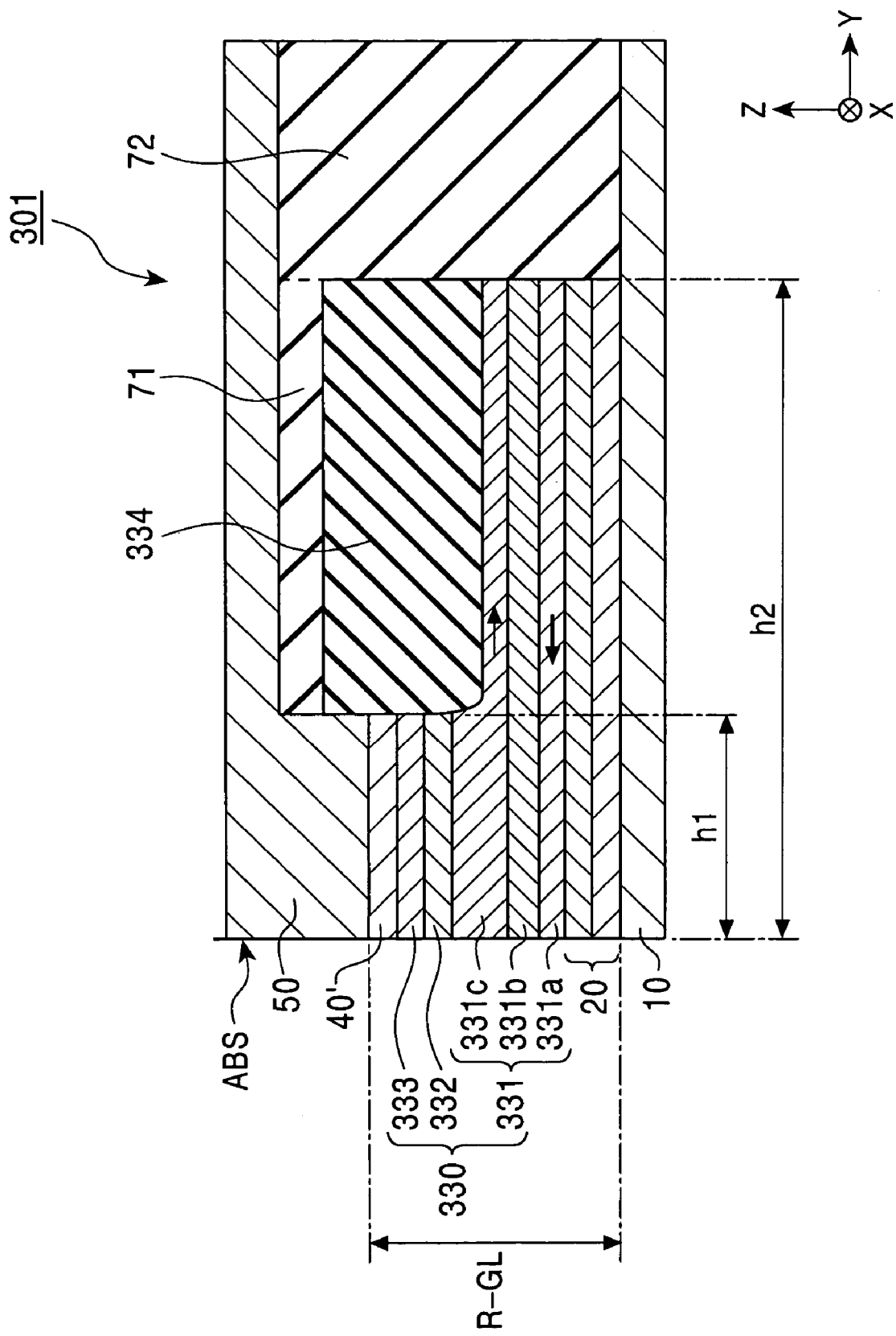
FIG. 15 is a partial sectional view showing the structure of a CPP giant magnetoresistive head according to a third embodiment of the present invention, taken along a central line of an element.
Figure 16:
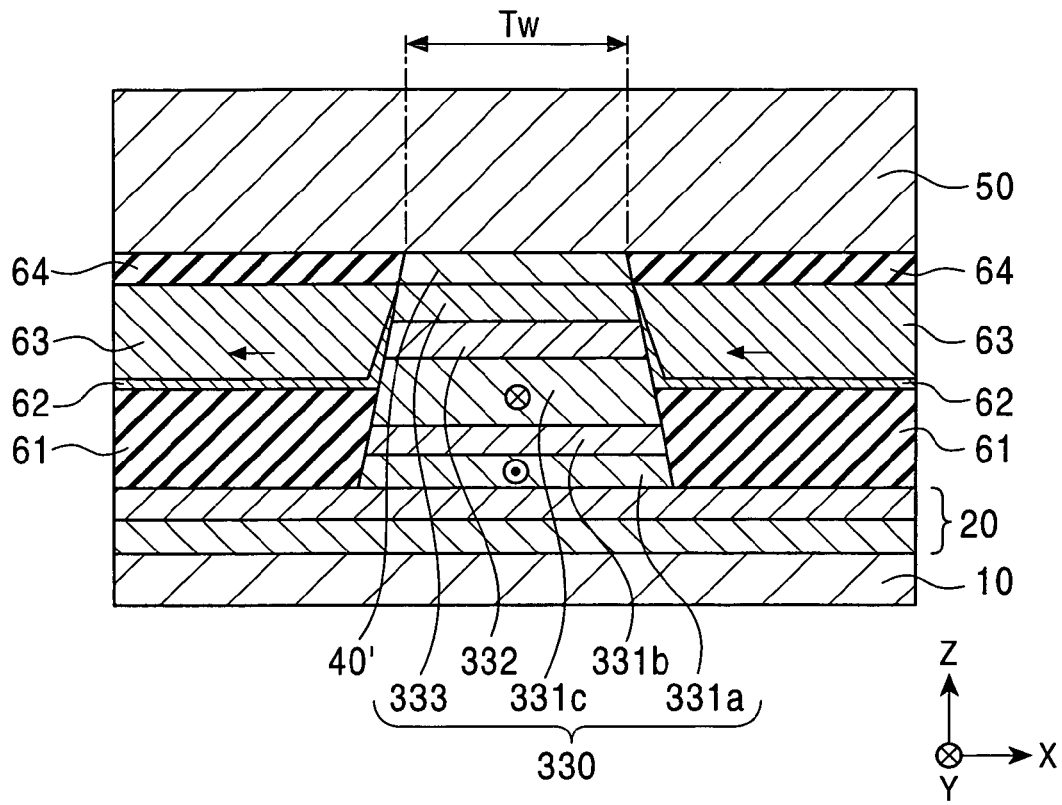
FIG. 16 is a partial sectional view showing the structure of the CPP giant magnetoresistive head shown in FIG. 15, as viewed from a surface facing a recording medium.
Figure 17:
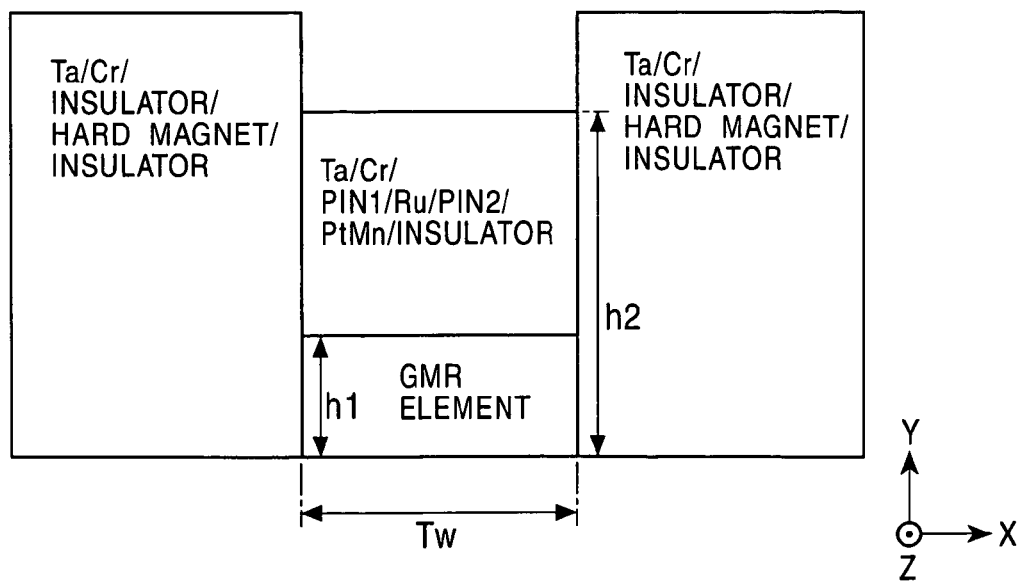
FIG. 17 is a schematic top plan view showing the GMR element shown in FIG. 15.

FIGS. 15 to 17 show a CPP giant magnetoresistive head (CPP-GMR head) according to a third embodiment of the present invention. The third embodiment is different from the first and second embodiments in that an insulating antiferromagnetic layer 334 is provided in the rear of a GMR element in the height direction, for pinning the magnetization direction of a pinned magnetic layer 31 in the height direction.

FIG. 15 is a partial sectional view showing the structure of a CPP GMR head 301, taken along a central line of an element, FIG. 16 is a partial sectional view showing the structure of the CPP GMR head 301, as viewed from a surface facing a recording medium, and FIG. 17 is a schematic top plan view of a GMR element 330. In FIGS. 15 to 17, the functions, shapes, materials and thicknesses of layers denoted by the same reference numerals as those in the first and second embodiments are the same as those in the first and second embodiments, and thus the description thereof is omitted.

The CPP-GMR head 301 comprises the GMR element 330 exhibiting the GMR effect when a sensing current is passed through the lower shield layer 10 and the upper shield layer 50 in the thickness direction. In the GMR element 330, a pinned magnetic layer 331 (a second pinned magnetic layer 331c, a nonmagnetic intermediate layer 331b, and a first pinned magnetic layer 331a), a nonmagnetic layer 332, and a free magnetic layer 333 are laminated in that order from below. The shapes, thicknesses and materials of the nonmagnetic layer 332 and the free magnetic layer 333 are the same as those of the nonmagnetic layer 32 and the free magnetic layer 33, respectively, of the first and second embodiments.

The pinned magnetic layer 331 extends to the rear of the nonmagnetic layer 332 and the free magnetic layer 333 in the height direction and in contact with the insulating antiferromagnetic layer 334 in a rear region in the height direction. The magnetization direction of the second pinned magnetic layer 331c of the pinned magnetic layer 331 is pinned in antiparallel to the height direction by an exchange coupling magnetic field produced at the interface with the insulating antiferromagnetic layer 334. The second and first pinned magnetic layers 331c and 331a have antiparallel magnetizations due to the RKKY interaction through the nonmagnetic intermediate layer 331b. Therefore, the magnetization direction of the first pinned magnetic layer 331a is pinned in the height direction.

The insulating antiferromagnetic layer 334 comprises, for example, Ni—O or $\alpha$-$Fe_2O_3$, and no sensing current flows through the insulating antiferromagnetic layer 334. Therefore, even when the insulating antiferromagnetic layer 334 is provided in contact with the lower surface of the second pinned magnetic layer 331c in the rear of the nonmagnetic layer 332 and the free magnetic layer 333 in the height direction, the sensing current flowing through the GMR element 330 does not flow into the insulating antiferromagnetic layer 334, thereby suppressing a loss of the sensing current. Also, the insulating antiferromagnetic layer 334 does not generate heat to suppress the generation of Joule heat.

The CPP-GMR head 301 of the third embodiment can be manufactured by the same manufacturing method as that of the second embodiment except that the insulating antiferromagnetic layer 334 is provided instead of the antiferromagnetic layer 34.

Figure 18:
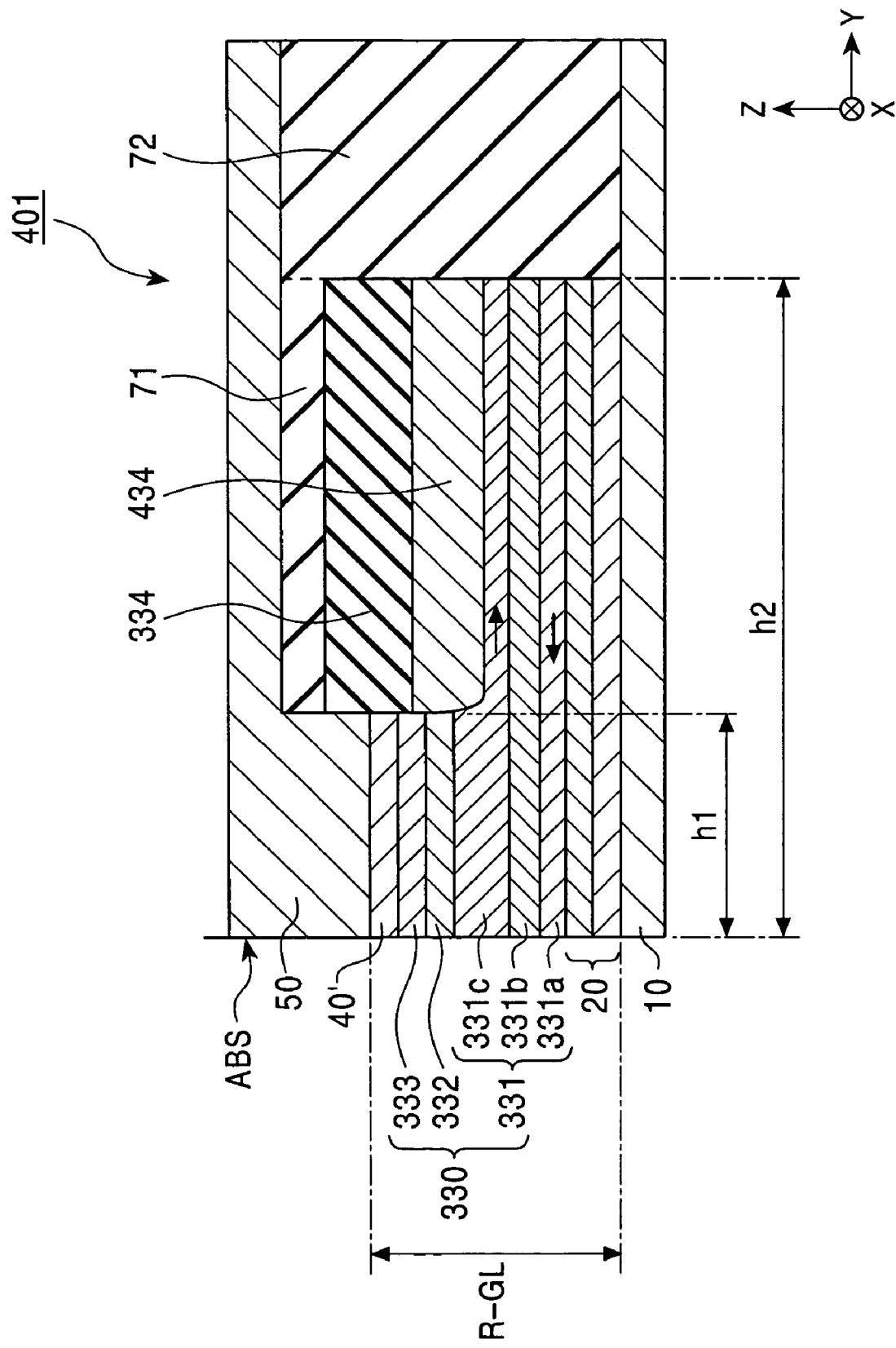
FIG. 18 is a partial sectional view showing the structure of a CPP giant magnetoresistive head according to a fourth embodiment of the present invention, taken along a central line of an element.
Figure 19:
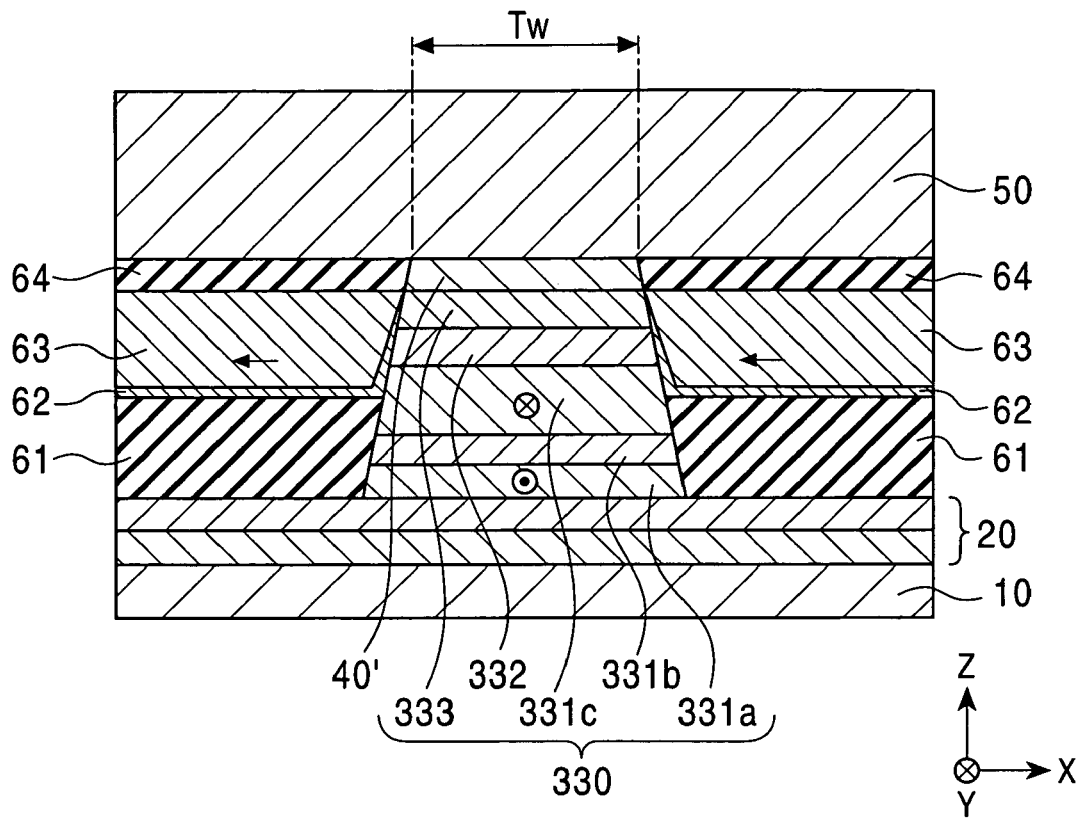
FIG. 19 is a partial sectional view showing the structure of the CPP giant magnetoresistive head shown in FIG. 18, as viewed from a surface facing a recording medium.
Figure 20:
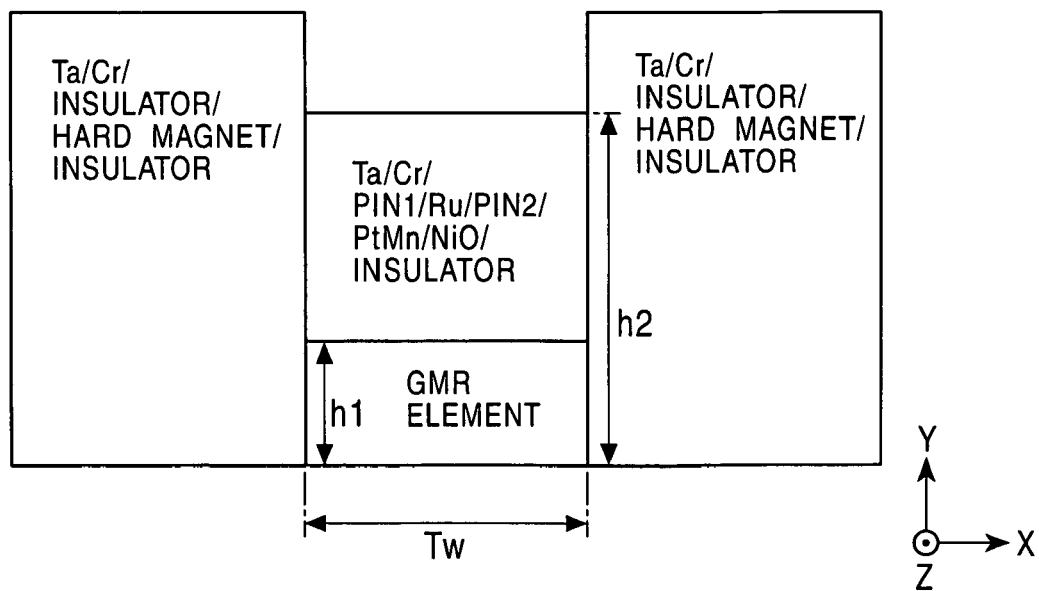
FIG. 20 is a schematic top plan view showing the GMR element shown in FIG. 18.

FIGS. 18 to 20 show a CPP giant magnetoresistive head (CPP-GMR head) according to a fourth embodiment of the present invention. The fourth embodiment is different from the third embodiment in that an antiferromagnetic metal layer 434 is interposed between the insulating antiferromagnetic layer 334 and the second pinned magnetic layer 331c of the third embodiment.

FIG. 18 is a partial sectional view showing the structure of a CPP GMR head 401, taken along a central line of an element, FIG. 19 is a partial sectional view showing the structure of the CPP GMR head 401, as viewed from a surface facing a recording medium, and FIG. 20 is a schematic top plan view of a GMR element 330. In FIGS. 18 to 20, the functions, shapes, materials and thicknesses of layers denoted by the same reference numerals as those in the third embodiment are the same as those in the third embodiment, and thus the description thereof is omitted.

The antiferromagnetic layer metal layer 434 comprises, for example, Pt—Mn or Ir—Mn. The insulating antiferromagnetic layer 334 has low crystallinity in the initial stage of deposition (because antiferromagnetic characteristics cannot be obtained unless the thickness is a predetermined value or more). When the insulating antiferromagnetic layer 334 is formed directly on the second pinned magnetic layer 331c, a small exchange coupling magnetic field is produced at the interface between the second pinned magnetic layer 331c and the insulating antiferromagnetic layer 334. On the other hand, the antiferromagnetic metal layer 434 produces a large exchange coupling magnetic field even at the lower interface with the second pinned magnetic layer 331c. Therefore, when the antiferromagnetic metal layer 434 is interposed between the second pinned magnetic layer 331c and the insulating antiferromagnetic layer 334, the exchange coupling magnetic field acting between the second pinned magnetic layer 331c and the insulating antiferromagnetic layer 334 can be increased. Also, since the insulating antiferromagnetic layer 334 is disposed above the antiferromagnetic metal layer 434, the sensing current does not flow into the antiferromagnetic metal layer 434, thereby preventing a loss of the sensing current.

The CPP-GMR head 401 of the fourth embodiment can be manufactured by the same manufacturing method as that of the second embodiment except that the antiferromagnetic metal layer 434 and the insulating antiferromagnetic layer 334 are laminated instead of forming the antiferromagnetic layer 34.

The insulating antiferromagnetic layer 334 used in the third and fourth embodiments is liable to have a higher blocking temperature than that of the antiferromagnetic metal layer comprising, for example, Pt—Mn or the like. However, the insulating antiferromagnetic layer 334 is disposed outside the GMR element, and thus the sensing current does not flow into the insulating antiferromagnetic layer 334 to avoid an excessive increase in temperature. In other words, such a high blocking temperature as required of the conventional antiferromagnetic layer (refer to FIG. 21) provided in the GMR element is not required. Therefore, the use of the insulating antiferromagnetic layer 334 provided outside the GMR element causes no problem. Also, the use of an insulating antiferromagnetic layer does not cause a problem.

In each of the above embodiments, the present invention is applied to a CPP-GMR head comprising a bottom spin-valve GMR element in which a pinned magnetic layer, a nonmagnetic layer, and a free magnetic layer are laminated in that order from below. However, the present invention can also be applied to a CPP-GMR head comprising a top spin-valve GMR element in which a free magnetic layer, a nonmagnetic layer and a pinned magnetic layer are laminated in that order from below. Also, in each of the embodiments, the present invention is applied to a single spin-valve CPP-GMR head. However, the present invention can also be applied to a dual spin-valve CPP-GMR head in which a lower pinned magnetic layer, a lower nonmagnetic layer, a free magnetic layer, an upper nonmagnetic layer and an upper pinned magnetic layer are laminated in that order from below.

Although, in each of the second to fourth embodiments, the antiferromagnetic layer 34 (or the insulating antiferromagnetic layer 334 and the antiferromagnetic metal layer 434) is provided in contact with the upper surface of the second pinned magnetic layer 31c (331c), it is sufficient to provide the antiferromagnetic layer outside the GMR element. When the pinned magnetic layer 31 (331) has a laminated ferrimagnetic structure, the antiferromagnetic layer 34 (or the insulating antiferromagnetic layer 334 and the antiferromagnetic metal layer 434) may be provided in contact with any one of the rear end surface of the first pinned magnetic layer 31a (331a) or the second pinned magnetic layer 31c (331c) in the height direction, the upper surface of the second pinned magnetic layer 31c (331c), the lower surface of the first pinned magnetic layer 31a (331a), and the upper surface of the first pinned magnetic layer 31a (331a). When the insulating antiferromagnetic layer 334 is provided on the pinned magnetic layer 31, the antiferromagnetic metal layer 434 is preferably provided between the insulating antiferromagnetic layer 334 and the pinned magnetic layer 31. In another embodiment, for example, at least a portion of the pinned magnetic layer 31 sufficiently extends in the track width direction, and the antiferromagnetic layers 34 (334) may be provided in contact with both sides of the pinned magnetic layer extending in the track width direction.

Although, in the second to fourth embodiments, the upper nonmagnetic metal layer 40' having substantially the same area as that of the free magnetic layer 33 is provided, the upper nonmagnetic metal layer 40' may be provided to a large thickness in a large area like the upper large-area nonmagnetic metal film 40 of the first embodiment.

The CPP-GMR head of each of the above embodiments can be applied not only to a reproducing thin film magnetic head but also to a recording thin film magnetic head comprising the reproducing thin film magnetic head and a recording inductive head laminated thereon.

What is claimed is:

1. A CPP giant magnetoresistive head comprising:
   lower and upper shield layers with a predetermined shield distance therebetween;
   a giant magnetoresistive (GMR) element disposed between the upper and lower shield layers, the GMR element having a group of adjacent parallel layers, the group consisting of a pinned magnetic layer, a free magnetic layer and a nonmagnetic layer disposed between the pinned magnetic layer and the free magnetic layer, wherein the pinned magnetic layer includes a laminated ferrimagnetic structure consisting of a first pinned magnetic sublayer and a second pinned magnetic sublayer which are laminated with a nonmagnetic intermediate layer disposed therebetween; and
   large-area nonmagnetic metal films abutting against the GMR element and the lower shield layer and between the GMR element and the upper shield layer, respectively, so that the large-area nonmagnetic metal films are in direct contact with the pinned magnetic layer and the free magnetic layer and have larger areas than those of the pinned magnetic layer and the free magnetic layer, respectively.

2. The CPP giant magnetoresistive head according to claim 1, wherein the large-area nonmagnetic metal films comprise first and second large-area nonmagnetic metal films, wherein the first large-area nonmagnetic film is located between the upper shield layer and the free magnetic layer, and wherein the second large-area nonmagnetic film is located between the lower shield layer and at least one of the first and second pinned magnetic sublayers.

3. The CPP giant magnetoresistive head according to claim 1, wherein the pinned magnetic layer comprises a magnetic material having a positive magnetostriction constant or a magnetic material having high coercive force, and an end of the pinned magnetic layer is exposed at a surface facing a recording medium.

4. The CPP giant magnetoresistive head according to claim 1, wherein the first and second pinned magnetic sublayers partially or entirely comprise Fe—Co—Cu (wherein Fe>10 atomic percent, Co>30 atomic percent, and Cu>5 atomic percent), Fe—Co—Cu—X (wherein X is at least one element of Pt, Pd, Mn, Si, Au, and Ag), or $Co_2MnY$ (wherein Y is at least one element of Ge, Si, Sn, and Al).

5. A CPP giant magnetoresistive head comprising:
   lower and upper shield layers with a predetermined shield distance therebetween;
   a giant magnetoresistive (GMR) element disposed between the upper and lower shield layers, the GMR element having a group of adjacent parallel layers, the group comprising a pinned magnetic layer, a free magnetic layer and a nonmagnetic layer disposed between the pinned magnetic layer and the free magnetic layer, the CPP giant magnetoresistive head being free of an antiferromagnetic layer between the upper and lower shield layers that passes generally perpendicularly through a vertical plane drawn through the group of adjacent parallel layers in a thickness direction, wherein a current flows in a direction of the vertical plane; and large-area nonmagnetic metal films provided between the giant magnetoresistive element and the lower shield layer and between the giant magnetoresistive element and the upper shield layer, respectively, so that the large-area nonmagnetic metal films are in direct contact with the pinned magnetic layer and the free magnetic layer and have larger areas than those of the pinned magnetic layer and the free magnetic layer, respectively, wherein the large-area nonmagnetic metal films are in direct contact with the lower shield layer and the upper shield layer respectively, wherein the pinned magnetic layer includes a laminated ferrimagnetic structure comprising a first pinned magnetic sublayer and a second pinned magnetic sublayer which are laminated with a nonmagnetic intermediate layer disposed therebetween, and wherein the pinned magnetic layer extends to a rear of the nonmagnetic layer and the free magnetic layer, in a height direction, and a dimension of the pinned magnetic layer in a height direction is larger than that in a track width direction.

6. The CPP giant magnetoresistive head according to claim 5, wherein the large-area nonmagnetic metal film disposed between the giant magnetoresistive element and the lower shield layer comprises any one of Ta/Cu, Ta/Ru/Cu, Ta/Cr, Ta/Ni—Cr, Ta/(Ni—Fe)—Cr, and Cr, and when the composition contains Cr, the Cr content exceeds 20 atomic percent.

7. A CPP giant magnetoresistive head comprising;

lower and upper shield layers with a predetermined shield distance therebetween;

a giant magnetoresistive (GMR) element disposed between the upper and lower shield layers, the GMR element having a group of adjacent parallel layers, the group comprising a pinned magnetic layer, a free magnetic layer and a nonmagnetic layer disposed between the pinned magnetic layer and the free magnetic layer, the CPP giant magnetoresistive head being free of an antiferromagnetic layer between the upper and lower shield layers that passes generally perpendicularly through a vertical plane drawn through the group of adjacent parallel layers in a thickness direction, wherein a current flows in a direction of the vertical plane; and large-area nonmagnetic metal films provided between the giant magnetoresistive element and the lower shield layer and between the giant magnetoresistive element and the upper shield layer, respectively, so that the large-area nonmagnetic metal films are in direct contact with the pinned magnetic layer and the free magnetic layer and have larger areas than those of the pinned magnetic layer and the free magnetic layer, respectively, wherein the large-area nonmagnetic metal films are in direct contact with the lower shield layer and the upper shield layer respectively, wherein the pinned magnetic layer has a laminated ferrimagnetic structure comprising a first pinned magnetic sublayer and a second pinned magnetic sublayer which are laminated with a nonmagnetic intermediate layer disposed therebetween, and wherein the pinned magnetic layer comprises a magnetic material having a positive magnetostriction constant, and an end of the pinned magnetic layer is exposed at a surface facing a recording medium.

8. The CPP giant magnetoresistive head according to claim 7, wherein the large-area nonmagnetic metal film disposed between the giant magnetoresistive element and the lower shield layer comprises any one of Ta/Cu, Ta/Ru/Cu, Ta/Cr, Ta/Ni—Cr, Ta/(Ni—Fe)—Cr, and Cr, and when the composition contains Cr, the Cr content exceeds 20 atomic percent.

* * * * *